(12) United States Patent
Yamakita et al.

(10) Patent No.: US 8,238,890 B2
(45) Date of Patent: Aug. 7, 2012

(54) COMMUNICATION CONNECTION DEVICE

(75) Inventors: Yoshinobu Yamakita, Hashima (JP);
Shigeki Takaya, Yamatotakada (JP);
Hidekazu Takahashi, Daito (JP)

(73) Assignee: Kyocera Corporation, Kyoto (JP)

( * ) Notice: Subject to any disclaimer, the term of this patent is extended or adjusted under 35 U.S.C. 154(b) by 686 days.

(21) Appl. No.: 12/066,464

(22) PCT Filed: Oct. 6, 2006

(86) PCT No.: PCT/JP2006/320060
§ 371 (c)(1),
(2), (4) Date: Mar. 11, 2008

(87) PCT Pub. No.: WO2007/046253
PCT Pub. Date: Apr. 26, 2007

(65) Prior Publication Data
US 2009/0270087 A1     Oct. 29, 2009

(30) Foreign Application Priority Data
Oct. 17, 2005   (JP) ................................. 2005-302018

(51) Int. Cl.
*H04M 3/42*   (2006.01)
(52) U.S. Cl. ..................... 455/415; 379/88.19; 379/88.2; 379/88.21
(58) Field of Classification Search ................ 455/426.1; 379/88.19–88.21, 207.15
See application file for complete search history.

(56) References Cited

U.S. PATENT DOCUMENTS

| | | | |
|---|---|---|---|
| 2003/0002645 A1* | 1/2003 | Worsham et al. | 379/211.03 |
| 2005/0288002 A1* | 12/2005 | Sparks et al. | 455/418 |
| 2006/0003783 A1* | 1/2006 | Fukui et al. | 455/517 |
| 2007/0064909 A1* | 3/2007 | Levy et al. | 379/211.03 |

FOREIGN PATENT DOCUMENTS

| | | |
|---|---|---|
| JP | 05-103092 | 4/1993 |
| JP | 7-307979 A | 11/1995 |
| JP | 10-79793 A | 3/1998 |
| JP | 2003-143303 A | 5/2003 |

OTHER PUBLICATIONS

International Search Report of PCT/JP2006/320060, date of mailing Oct. 31, 2006.
Decision of Refusal (English translation) for JP 2005-302018, mailed Nov. 4, 2009, 2 pages.

* cited by examiner

*Primary Examiner* — Marcos Batista
(74) *Attorney, Agent, or Firm* — Morrison & Foerster LLP

(57) ABSTRACT

Provided is a communication connection device that, if receiving an incoming call in which a representative telephone number that represents a group of mobile telephones is dialed, ensures that one of users of the mobile telephones answers the incoming call for sure. The communication connection device (i) establishes communication between a call originator and a mobile telephone when receiving a signal from the call originator, (ii) reads first information pieces from a storage device when receiving the signal that contains second information each first information piece being identification information that identifies a different one of a plurality of mobile telephones, the second information being identification information that collectively identifies the mobile telephones as a group, and the storage device having pre-stored therein, in correspondence, the first information pieces and the second information, and (iii) in a predetermined order, calls the mobile telephones identified by the read first information pieces.

13 Claims, 14 Drawing Sheets

FIG.4

| PRIORITY ORDER | INDIVIDUAL TELEPHONE NUMBER |
|---|---|
| 1 | 050-123-○○○○ |
| 3 | 050-123-○○○× |
| 2 | 050-123-○○×× |
| 5 | 050-123-○××× |
| 4 | 050-123-○×○× |
| ⋮ | ⋮ |

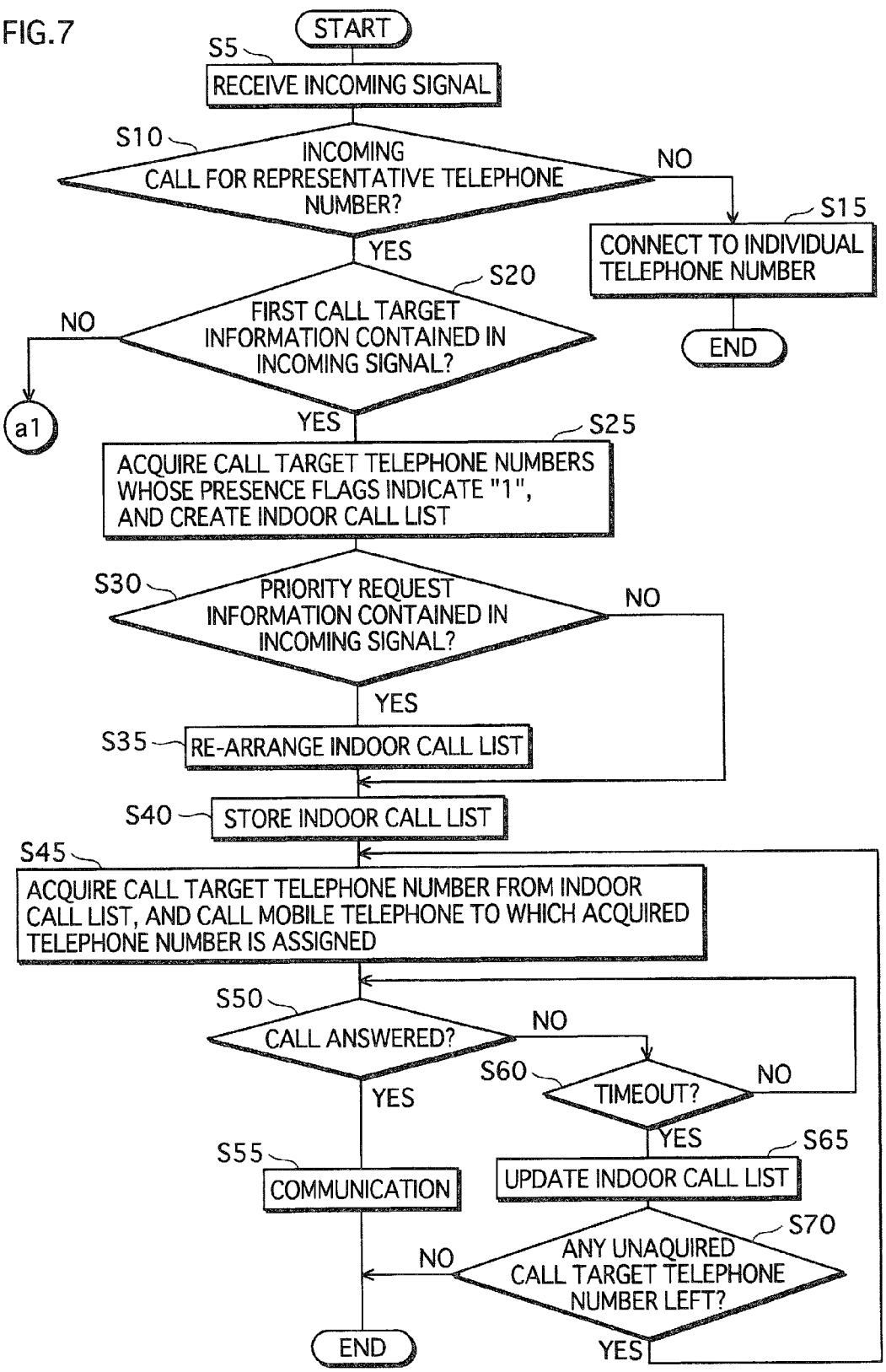

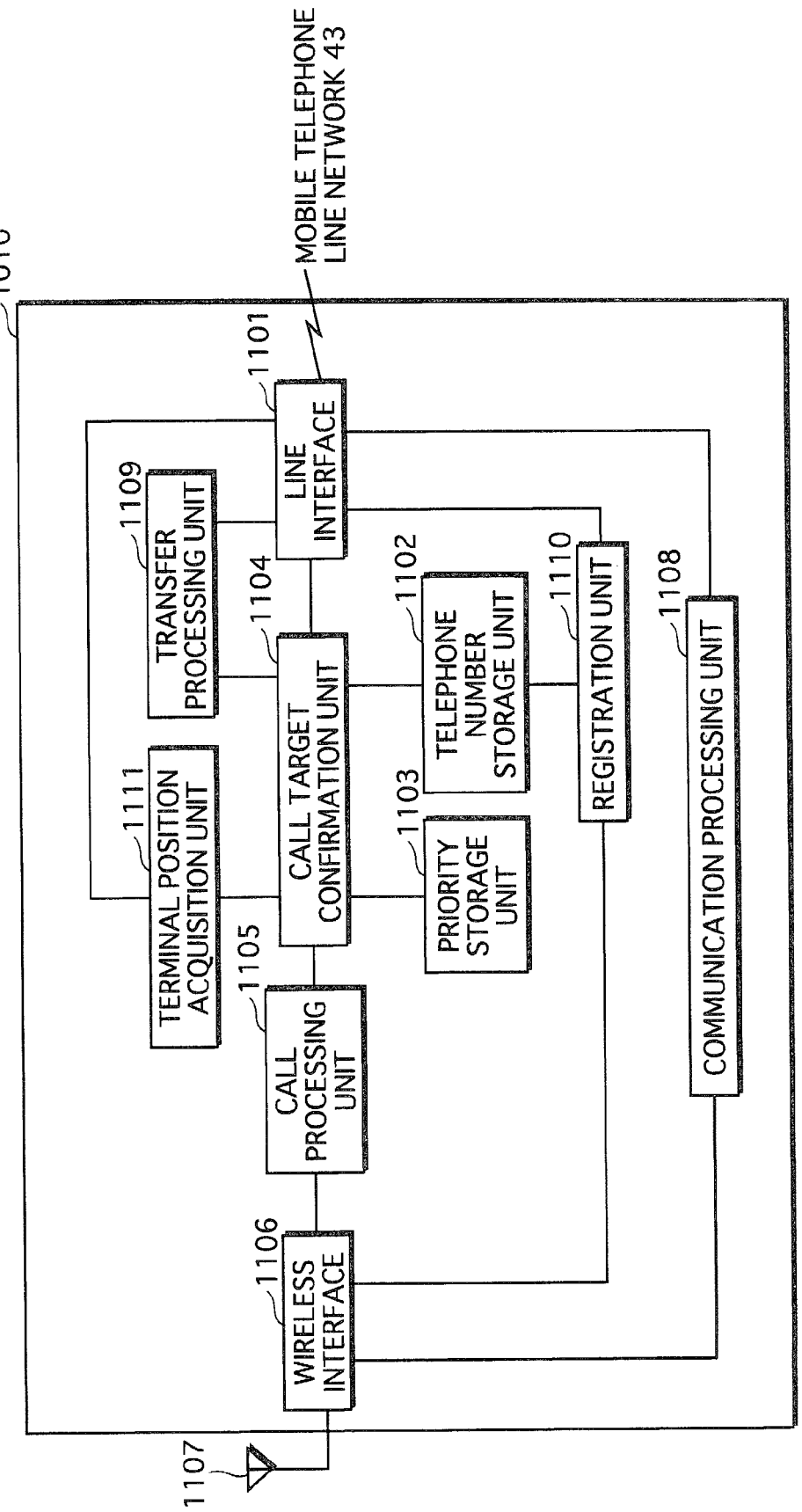

| TELEPHONE NUMBER | TERMINAL POSITION INFORMATION |
|---|---|
| 050-123-○××× | 34° 40' NORTH, 135° 37' EAST |
| 050-123-○×○× | 34° 41' NORTH, 135° 30' EAST |

| TELEPHONE NUMBER | TERMINAL POSITION INFORMATION |
|---|---|
| 050-123-○×○× | 34° 41' NORTH, 135° 30' EAST |
| 050-123-○××× | 34° 40' NORTH, 135° 37' EAST |

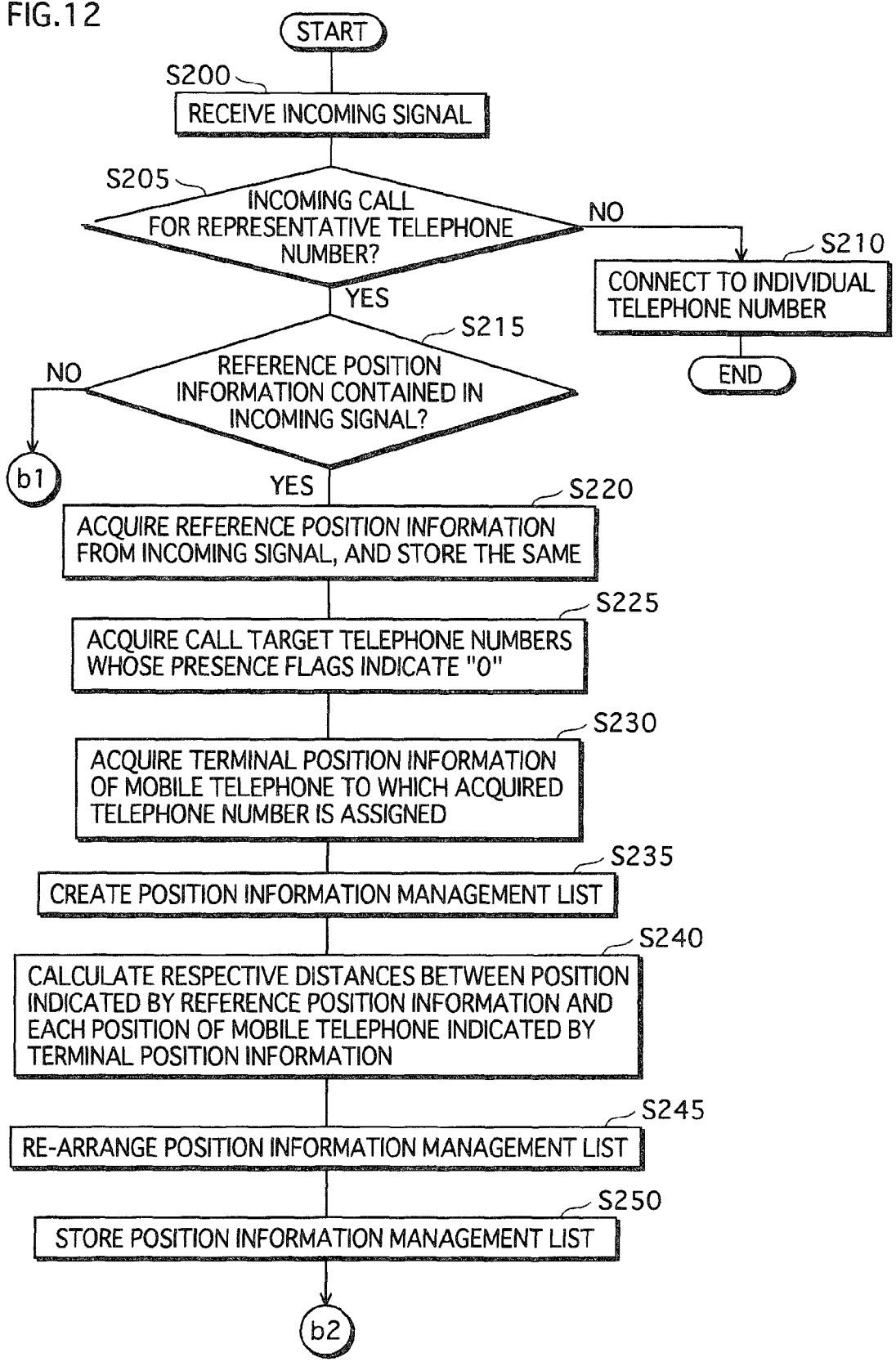

COMMUNICATION CONNECTION DEVICE

TECHNICAL FIELD

The present invention relates to technology for calling a plurality of mobile telephones that belong to a group by using identification information (e.g., a representative telephone number) that represents the group.

BACKGROUND ART

As mobile telephones have spread rapidly in recent years, an increasing number of people have their own personal mobile telephones and are thereby able to communicate with one another with much ease.

However, in order for a calling party to contact someone in his/her family, or someone in a store or an office without specifying a particular someone, the calling party needs to know all the telephone numbers of the mobile telephones owned by the members of the family, the store, or the office. In this case, the calling party also needs to repeat an operation for connection on the mobile telephone until he/she can reach someone in the family, the store, or the office. The calling party may find it inconvenient to repeat such an operation.

Given the above factor, the following technology has been used: all the telephone numbers of a plurality of mobile telephones are pre-registered as belonging to one group on a telephone exchange that is placed on a premise. If the telephone exchange receives an incoming call in which a representative telephone number representing the pre-registered group is dialed, it will call every single telephone number that belongs to the group all at once, and connect the calling party to any mobile telephone that has answered to the incoming call.

DISCLOSURE OF THE INVENTION

The Problems the Invention is Going to Solve

As set forth, if the telephone exchange receives an incoming call in which the representative telephone number is dialed, it will call every single telephone number that belongs to the group all at once. The problem with such a system is that every one of the called parties tends to assume that the call must be for someone else in the group, rather than that the call is for him/herself. They all expect someone else in the group to answer the incoming call, consequently delaying their answers to the incoming call.

In view of the above problem, the present invention aims to provide a communication connection device and a calling method which ensure, if receiving an incoming call in which the representative telephone number (e.g., a representative telephone number or equivalent symbols) that represents a group of mobile telephones is dialed, that one of users of the mobile telephones answers the incoming call for sure.

Means to Solve the Problems

In order to solve the above program, the present invention is a communication connection device that, when receiving a signal from a call originator, establishes communication between the call originator and a mobile telephone, comprising: a read unit operable to read first information pieces from a storage device when receiving the signal that contains second information, each first information piece being identification information that identifies a different one of a plurality of mobile telephones, the second information being identification information that collectively identifies the mobile telephones as a group, and the storage device having pre-stored therein, in correspondence, the first information pieces and the second information; and a call unit operable to, in a predetermined order, call the mobile telephones that are identified by the first information pieces read by the read unit.

BRIEF DESCRIPTION OF THE DRAWING

FIG. 4 shows an example of a data structure of a priority table T110;

FIG. 5A shows an example of a data structure of an indoor call list T120 which is generated in accordance with an order of call target telephone numbers that are stored in the telephone number storage unit 102, FIG. 5B shows an example of a data structure of an indoor call list T121 which includes contents of the indoor call list T120 that have been re-arranged in order of priority, and FIG. 5C shows an example of a data structure of an indoor call list T122 which includes contents of the indoor call list T121 that have been updated after there was no answer to a call;

FIG. 7 is a flowchart showing operations performed when the communication connection device 10 has received an incoming signal, continuing to FIG. 8;

FIG. 10 is a block diagram showing a structure of a communication connection device 1010;

FIG. 11A shows an example of a data structure of a position information management list T200 which is generated in accordance with an order of call target telephone numbers that are stored in a telephone number storage unit 1102, and FIG. 11B shows an example of a data structure of a position information management list T201 which includes contents of the position information management list T200 that have been re-arranged in order of priority;

FIG. 12 is a flowchart showing operations performed when the communication connection device 1010 receives an incoming signal, continuing to FIG. 13;

Figure 1:
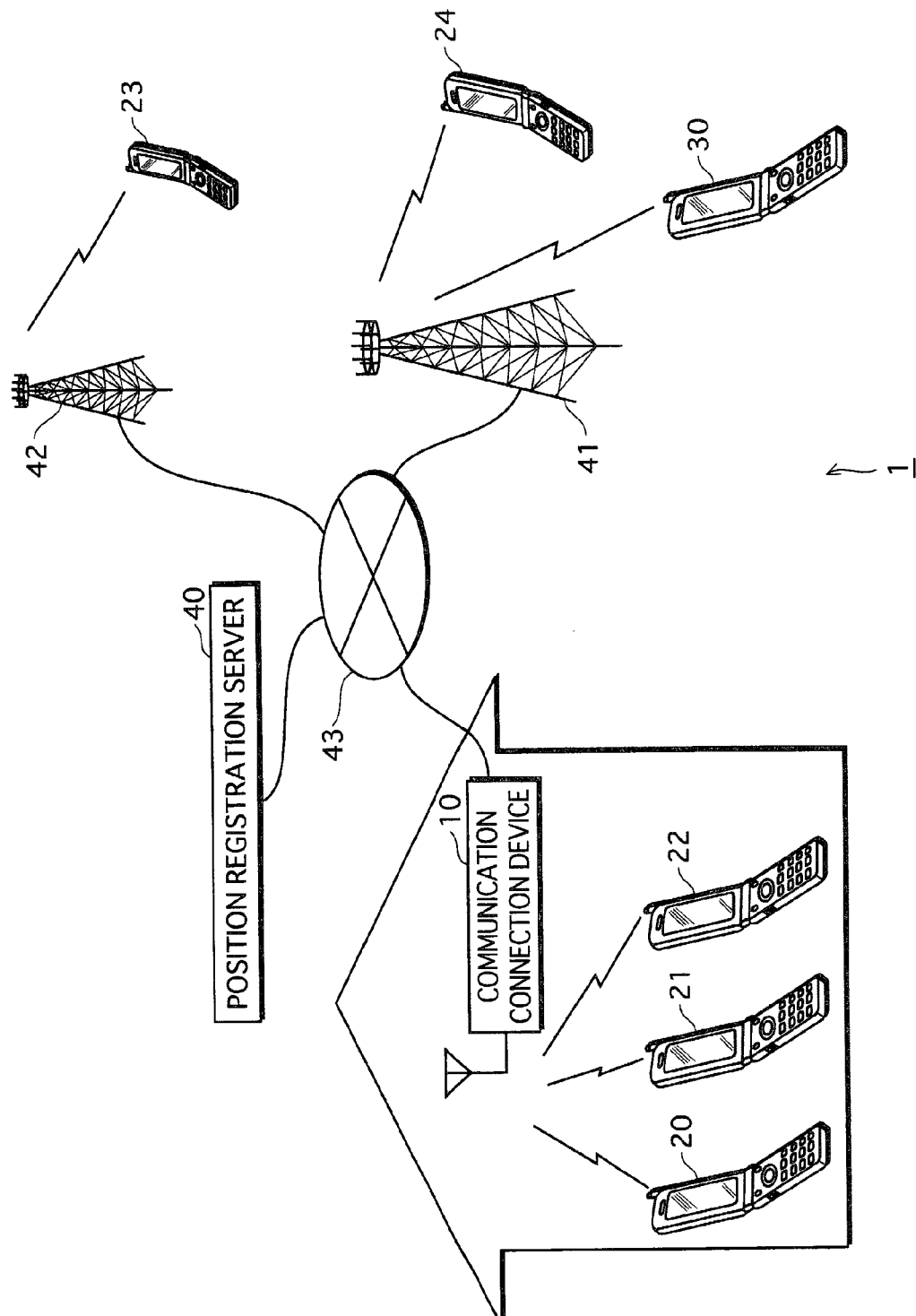
FIG. 1 shows an outline of a communication connection system 1.

DESCRIPTION OF CHARACTERS 1 communication connection system
10 communication connection device 20, 21, 22, 23, 24 mobile telephone
30 mobile telephone
40 position registration server
41, 42 public base station device
43 mobile telephone line network
100 communication connection device
101 line interface
102 telephone number storage unit
103 priority storage unit
104 call target confirmation unit
105 call processing unit
106 wireless interface
107 antenna
108 communication processing unit
109 transfer processing unit
110 registration unit
1010 communication connection device
1101 line interface
1102 telephone number storage unit
1103 priority storage unit
1104 call target confirmation unit
1105 call processing unit
1106 wireless interface
1107 antenna
1108 communication processing unit
1109 transfer processing unit
1110 registration unit
1111 terminal position acquisition unit

BEST MODES FOR CARRYING OUT THE INVENTION

1. First Embodiment

The following describes a communication connection device 10 as incorporated in a first embodiment of the present invention.

1.1 Overview

FIG. 1 shows a communication connection system 1. The communication connection system 1 is composed of: the communication connection device 10; mobile telephones 20, 21, 22, 23, 24 and 30; a position registration server 40; public base station devices 41 and 42; and a mobile telephone line network 43.

The communication connection device 10 is placed inside a house (hereinafter, simply "indoors"), and regards the mobile telephones 20, 21, 22, 23 and 24 as belonging to one group. The communication connection device 10 has pre-stored therein (i) telephone numbers that are respectively assigned to the mobile telephones and (ii) a representative telephone number that represents the group. Here, the representative telephone number is, for example, a telephone number that is assigned to the communication connection device 10 and is thus different from any of the telephone numbers assigned to the mobile telephones 20, 21, 22, 23 and 24. The representative telephone number assigned to the communication connection device 10 is also different from any other representative telephone numbers that are assigned to other communication connection devices (not illustrated). Furthermore, the communication connection device 10 has a function of communicating via a wireless LAN as well as the mobile telephone line network 43. It is regarded that the wireless LAN allows communication in an indoor coverage area where the communication connection device 10 is placed; the outside of the house (hereinafter, "outdoors") is regarded as the outside of the indoor coverage area.

Based on position registration requests from the mobile telephones, the position registration server 40 manages current positions of the mobile telephones. For example, the position registration server 40 stores therein and manage, as information, a pair of (i) a telephone number of a mobile telephone and (ii) a station ID that uniquely identifies a public base station device and a communication connection device that are positioned in an area to which the mobile telephone belongs.

The position registration server 40 also stores therein a pair of (i) a station ID that identifies the communication connection device 10 and (ii) the representative telephone number assigned to the communication connection device 10.

The mobile telephones 20, 21, 22, 23 and 24 each have a function of communicating via the wireless LAN as well as CDMA (Code Division Multiple Access). Once the mobile telephones 20, 21, 22, 23 and 24 enter their respective areas of the public base station devices, they receive a pilot signal from the public base station devices, and control themselves so as to perform communication over CDMA. On the other hand, once the mobile telephones 20, 21, 22, 23 and 24 enter the coverage area of the communication connection device 10, they receive a pilot signal from the communication connection device 10, and control themselves so as to perform communication over the wireless LAN. If the mobile telephones 20, 21, 22, 23 and 24 are in an area that is covered by both coverage areas of the public base station device 41 and the communication connection device 10, they receive both the pilot signal from the public base station device 41 and the pilot signal from the communication connection device 10. In this case, however, the mobile telephones 20, 21, 22, 23 and 24 are connected to the communication connection device 10 by priority, and control themselves so as to perform communication over the wireless LAN. Note that it is regarded that the mobile telephones 20, 21 and 22 are positioned indoors where the communication connection device 10 is placed, while the mobile telephones 23, 24 and 30 are positioned outdoors.

By dialing the representative telephone number, the mobile telephone 30 places a call via the public base station device 41, the mobile telephone line network 43 and the communication connection device 10. Normally, when the mobile telephone 30 calls another mobile telephone, an incoming signal is sent to the other mobile telephone. The incoming signal contains at least (i) information indicating that the call has been being placed, (ii) a telephone number of a calling party, and (iii) a telephone number dialed by the calling party.

When the mobile telephone 30 dials the representative telephone number and issues an instruction to call one or more telephone numbers in order of priority, the incoming signal further contains priority request information requesting that the telephone numbers be called in order of priority. When a mobile telephone that is positioned indoors is the call target, the incoming signal further contains first call target information indicating that the call target is a mobile telephone that is positioned indoors. When both a mobile telephone positioned indoors and a mobile telephone positioned outdoors are the call targets, the incoming signal further contains second call target information indicating that the call targets are mobile telephones that are positioned both indoors and outdoors.

Upon detecting an incoming signal that the mobile telephone 30 has sent by dialing the representative telephone number via the public base station device 41 and the mobile telephone line network 43, the communication connection device 10 determines one or more call target mobile telephones based on the information contained in the incoming signal, and sequentially call the one or more determined mobile telephones.

1.2 Structure of Communication Connection Device 10

Figure 2:
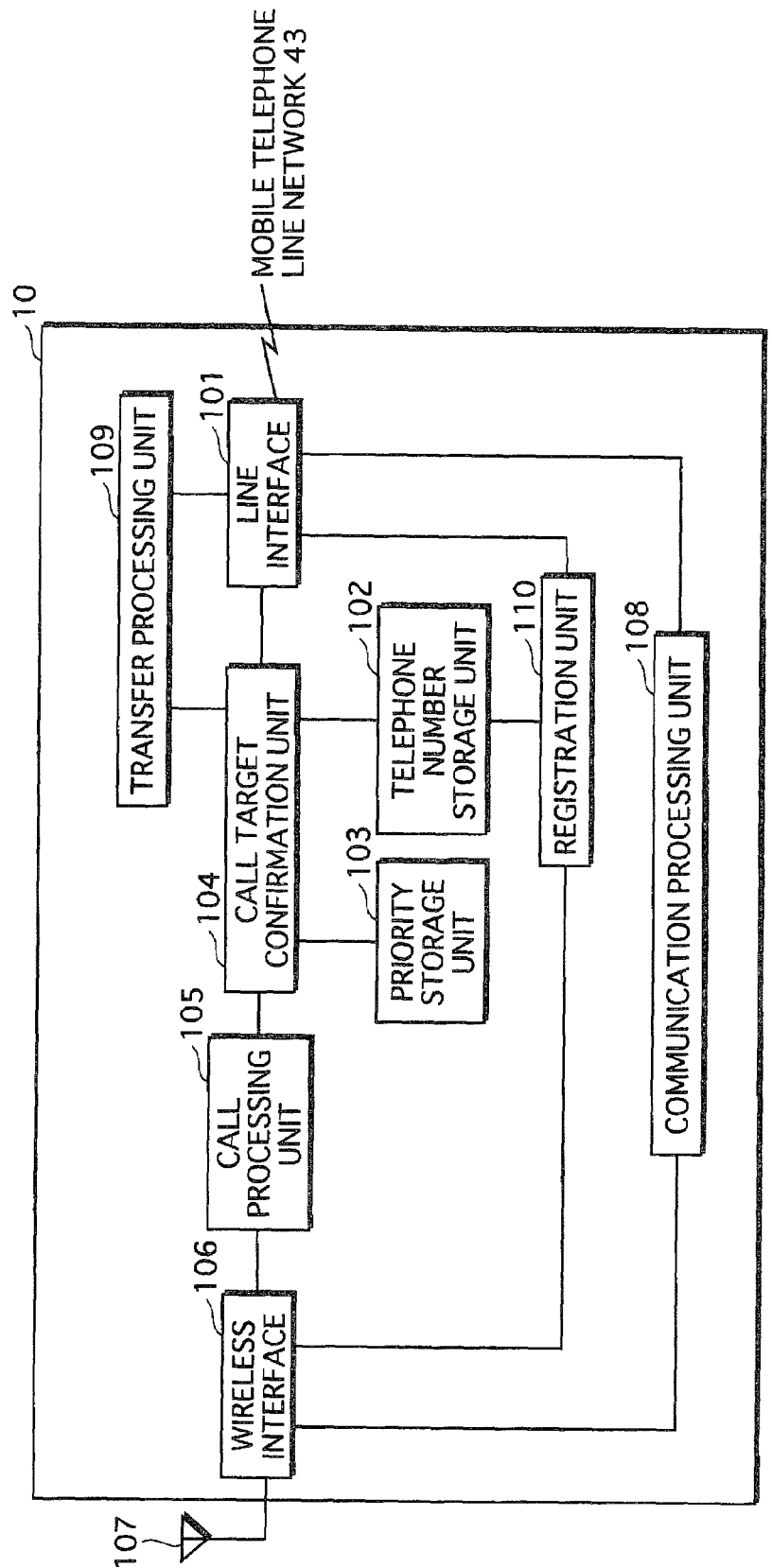
FIG. 2 is a block diagram showing a structure of a communication connection device 10.

As shown in FIG. 2, the communication connection device 10 includes: a line interface 101; a telephone number storage unit 102; a priority storage unit 103; a call target confirmation unit 104; a call processing unit 105; a wireless interface 106; an antenna 107; a communication processing unit 108; a transfer processing unit 109; and a registration unit 110.

Specifically, the communication connection device 10 is a computer system composed of a microprocessor, a ROM, a RAM, a hard disk unit, a display unit, etc. A computer program is stored in the ROM or the hard disk unit. The communication connection device 10 achieves its functions by the microprocessor operating in accordance with the computer program.

(1) Line Interface 101

The line interface 101 is an interface for connecting to the mobile telephone line network 43—more specifically, to an optical line. Note that the line interface 101 is not limited to the interface for connecting to the optical line; it may be an interface for connecting to, for example, ADSL.

Once the mobile telephone 30 has placed a call, the line interface 101 receives a reception signal via the public base station device 41 and the mobile telephone line network 43. Examples of the reception signal include: an incoming signal that is sent in association with the incoming call; and an audio signal that is sent during a telephone conversation.

If receiving the incoming signal as the reception signal, the line interface 101 outputs the received incoming signal to the call target confirmation unit 104. On the other hand, if receiving the audio signal as the reception signal, the line interface 101 outputs the received audio signal to the communication processing unit 108.

Upon receiving an audio signal from the communication processing unit 108, the line interface 101 sends the received audio signal to the mobile telephone 30 via the mobile telephone line network 43 and the public base station device 41.

Upon receiving the position registration request from the registration unit 110, the line interface 101 sends the following to the position registration server 40 over the mobile telephone line network 43: (i) the received position registration request; and (ii) the station ID assigned to the communication connection device 10. Here, the position registration request is composed of a mobile telephone number and information indicating that the registration request is being made.

Upon receiving a signal of transfer processing from the transfer processing unit 109, the line interface 101 sends the received signal to a transfer destination mobile telephone over the mobile telephone line network 43.

Upon receiving, from the call target confirmation unit 104, a signal that should be sent to the mobile telephone 30, the line interface 101 sends the received signal to the mobile telephone 30 via the mobile telephone line network 43 and the public base station device 41.

(2) Telephone Number Storage Unit 102

Figure 3:
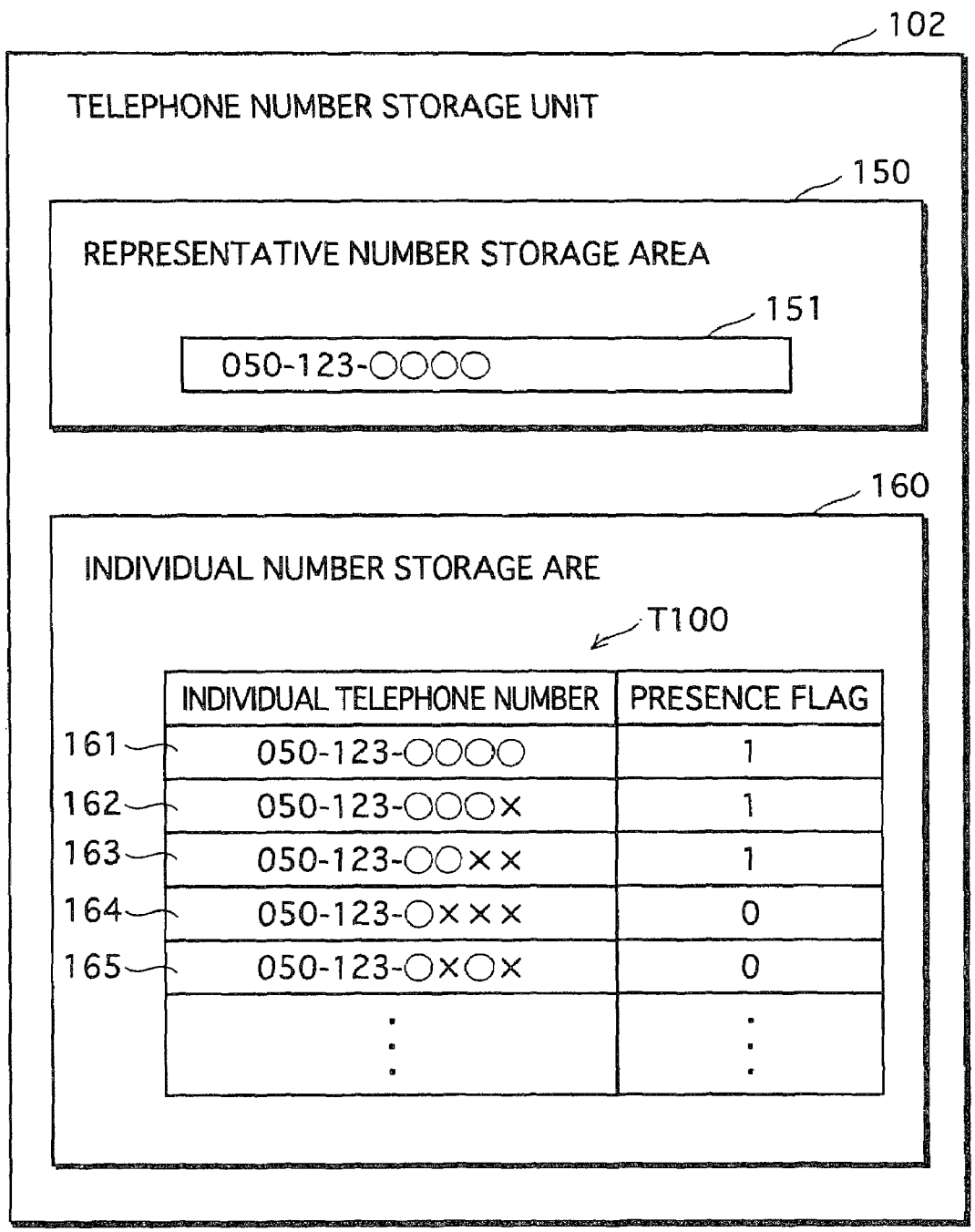
FIG. 3 shows information stored in a telephone number storage unit 102.

As shown in FIG. 3, the telephone number storage unit 102 is composed of a representative number storage area 150 and an individual number storage area 160.

The representative number storage area 150 has pre-stored therein a representative telephone number 151 that represents the group of the mobile telephones 20, 21, 22, 23 and 24.

As shown in FIG. 3, the individual number storage area 160 contains a number management table T100, which has an area for storing therein a plurality of pairs each comprising an individual telephone number and a presence flag.

Each of the individual telephone numbers represents a different one of the telephone numbers that belong to the group indicated by the representative telephone number 151.

The presence flags indicate whether or not the mobile telephones shown by the individual telephone numbers are within the coverage area of the communication connection device 10; a mobile telephone with a presence flag indicating a value "1" is within the coverage area (i.e., positioned indoors), whereas a mobile telephone with a presence flag indicating a value "0" is outside the coverage area (i.e., positioned outdoors).

Here, the number management table T100 stores therein five individual telephone numbers 161, 162, 163, 164 and 165. The telephone numbers 161, 162, 163, 164 and 165 are assigned to the mobile telephones 20, 21, 22, 23 and 24, respectively.

The representative telephone number is pre-stored into the representative number storage area 150 by the communication connection device 10 writing the representative telephone number thereto. Similarly, the individual telephone numbers are pre-stored into the number management table T100 by the communication connection device 10 writing the individual telephone numbers thereto.

(3) Priority Storage Unit 103

The priority storage unit 103 contains a priority table T110 that is shown in FIG. 4.

The priority table T110 has an area for storing therein one or more pairs of (i) a priority order and (ii) an individual telephone number.

The priority order numerically expresses a priority order for the call; the smaller the value, the higher the priority. The individual telephone numbers are the telephone numbers stored in the individual number storage area 160. In FIG. 4, for example, the telephone number assigned to the mobile telephone 20 has the highest priority. Likewise, the telephone numbers assigned to the mobile telephones 22, 21, 24 and 23 have the second, third, fourth and fifth highest priorities, respectively.

(4) Call Target Confirmation Unit 104

The call target confirmation unit 104 contains a list storage area for storing therein (i) an indoor call list which includes the call target telephone numbers that are positioned indoors, and (ii) an outdoor call list which includes the call target telephone numbers that are positioned outdoors.

The call target confirmation unit 104 receives the incoming signal from the line interface 101.

The call target confirmation unit 104 judges whether or not the telephone number dialed, which is contained in the received incoming signal, matches the representative telephone number 151.

If judging the telephone number dialed does not match the representative telephone number 151, the call target confirmation unit 104 outputs, to the call processing unit 105, (i) the received incoming signal and (ii) information indicating that the incoming call is placed by dialing one of the individual telephone numbers.

If judging the telephone number dialed matches the representative telephone number 151, the call target confirmation unit 104 further judges which one of the first call target information or the second call target information is contained, as the information indicating the call target, in the incoming signal.

(Case 1: First Call Target Information is Contained)

If judging that the first call target information is contained, the call target confirmation unit 104 acquires, from the number management table T100, all the telephone numbers whose presence flags indicate "1". Here, the call target confirmation unit 104 acquires, from the number management table T100, the telephone numbers 161, 162 and 163 that are assigned to the mobile telephones 20, 21 and 22, respectively.

By using all of the acquired telephone numbers, the call target confirmation unit 104 generates the indoor call list that includes the call target telephone numbers, in accordance with the order of the call target telephone numbers stored in the number management table T100. An example of the generated indoor call list is shown in FIG. 5A as an indoor call list T120.

The call target confirmation unit 104 judges whether or not the priority request information is contained in the incoming signal. If judging the priority request information is contained in the incoming signal, the call target confirmation unit 104 acquires the priority table T110, and based on the acquired priority table T110, re-arranges the generated indoor call list in order of priority. Re-arranging the indoor call list T120 based on the priority table T110 results in an indoor call list T121, which is shown in FIG. 5B. The call target confirmation unit 104 stores the re-arranged indoor call list into the list storage area.

If judging the priority request information is not contained in the incoming signal, the call target confirmation unit 104 stores the generated indoor call list into the list storage area.

The call target confirmation unit 104 acquires the call target telephone number that is at the top of the indoor call list stored in the list storage area, and then outputs the following to the call processing unit 105: (i) the acquired call target telephone number; (ii) the incoming signal received from the line interface 101; and (iii) information indicating that the incoming call is placed by dialing the representative telephone number. The call target confirmation unit 104 sends, via the line interface 101 to the mobile telephone 30, a signal indicating the current call target telephone number. Accordingly, the mobile telephone 30 displays, on its display, the telephone number indicated by the received signal as the telephone number that is currently being called. Note that instead of displaying the telephone number on the display, the mobile telephone 30 may notify the same to its user by other methods, such as voice navigation.

Upon receiving call timeout information indicating that the call processing unit 105 has run out of time to perform call processing, the call target confirmation unit 104 updates the indoor call list by discarding the call target telephone number that is at the top of the indoor call list, with the result that the indoor call list now includes the remaining call target telephone numbers. An indoor call list T122 shown in FIG. 5C is the result of this update—i.e., the result of discarding the telephone number assigned to the mobile telephone 20 after no answer was made from the mobile telephone 20. Then, the call target confirmation unit 104 outputs the following to the call processing unit 105: (i) the telephone number that is at the top of the updated indoor call list; (ii) the incoming signal received from the line interface 101; and (iii) the information indicating that the incoming call is placed by dialing the representative telephone number.

When there is no more call target telephone number left, the call target confirmation unit 104 sends, via the line interface 101 to the mobile telephone 30, a signal indicating that none of the call target mobile telephones positioned indoors has answered the incoming call. Accordingly, the mobile telephone 30 displays, on its display, that none of the call target mobile telephones positioned indoors has answered the incoming call. Note that instead of displaying such on the display, the mobile telephone 30 may notify the same to its user by other methods, such as voice navigation.

(Case 2: Second Call Target Information is Contained)

If judging that the second call target information is contained in the incoming signal, the call target confirmation unit 104 generates the indoor call list. The indoor call list is generated in the same manner as it is generated when the first call target information is contained in the incoming signal. Hence, a description of the operation of generating the indoor call list is omitted here.

The call target confirmation unit 104 acquires, from the number management table T100, all the telephone numbers whose presence flags indicate "0". Here, the call target confirmation unit 104 acquires, from the number management table T100, the telephone numbers 164 and 165 that are assigned to the mobile telephones 23 and 24, respectively.

Figure 6A:
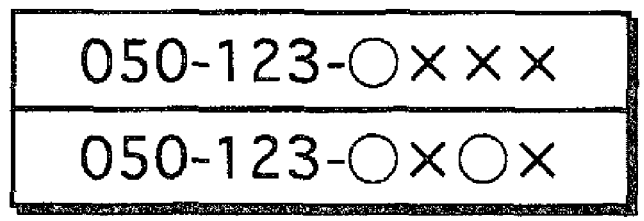
FIG. 6A shows an example of a data structure of an outdoor call list T130 which is generated in accordance with the order of the call target telephone numbers that are stored in the telephone number storage unit 102.

Using all of the acquired telephone numbers, the call target confirmation unit 104 generates the outdoor call list that includes the call target telephone numbers, in accordance with the order of the call target telephone numbers stored in the number management table T100. An example of the generated outdoor call list is shown in FIG. 6A as an outdoor call list T130.

Figure 6B:
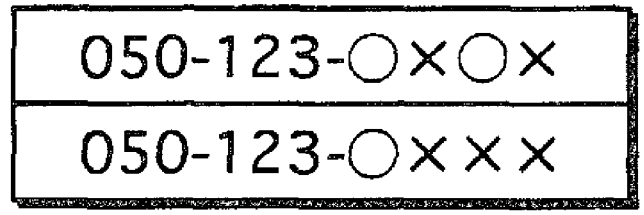
FIG. 6B shows an example of a data structure of an outdoor call list T131 which includes contents of the outdoor call list T130 that have been re-arranged in order of priority.

The call target confirmation unit 104 judges whether or mot the priority request information is contained in the incoming signal. If judging the priority request information is contained in the incoming, signal, the call target confirmation unit 104 acquires the priority table T110, and based on the acquired priority table T110, re-arranges the generated indoor call list and outdoor call list in order of priority. Re-arranging the outdoor call list T130 based on the priority table T110 results in an outdoor call list T131, which is shown in FIG. 6B.

The call target confirmation unit 104 stores the re-arranged indoor call list and outdoor call list into the list storage area.

If judging the priority request information is not contained in the incoming signal, the call target confirmation unit 104 stores the generated indoor call list and outdoor call list into the list storage area.

The call target confirmation unit 104 acquires the call target telephone number that is at the top of the indoor call list stored in the list storage area, and then outputs the following to the call processing unit 105: (i) the acquired call target telephone number; (ii) the incoming signal received from the line interface 101; and (iii) the information indicating that the incoming call is placed by dialing the representative telephone number. From here on, the call target confirmation unit 104 conducts the same operations as it does when the first call target information is contained in the incoming signal. Hence, a description of such operations is omitted here.

Once the call target confirmation unit 104 has sent, to the mobile telephone 30, the signal indicating that none of the call target mobile telephones included in the indoor call list has answered the incoming call, the call target confirmation unit 104 conducts the following operations.

The call target confirmation unit 104 acquires the call target telephone number that is at the top of the rout door call list stored in the list storage area, and outputs the following to the transfer processing unit 109: (i) the acquired call target telephone number; (ii) the incoming signal received from the line interface 101; and (iii) the information indicating that the incoming call is placed by dialing the representative telephone number. Also, the call target confirmation unit 104 sends, via the line interface 101 to the mobile telephone 30, a signal indicating the current call target telephone number. Accordingly, the mobile telephone 30 displays, on its display, the telephone number indicated by the received signal as the telephone number that is currently being called. Note that instead of displaying the telephone number on the display, the mobile telephone 30 may notify the same to its user by other methods, such as voice navigation.

Upon receiving transfer timeout information indicating that the transfer processing unit 109 has run out of time to perform the transfer processing, the call target confirmation unit 104 updates the outdoor call list by discarding the call target telephone number that is at the top of the outdoor call list, with the result that the outdoor call list now includes the remaining call target telephone numbers. Then, the call target confirmation unit outputs the following to the transfer processing unit 109: (i) the telephone number that is at the top of the updated outdoor call list; (ii) the incoming signal received from the line interface 101; and (iii) the information indication that the incoming call is placed by dialing the representative telephone number.

When there is no more call target telephone number left, the call target confirmation unit 104 sends, via the line interface 101 to the mobile telephone 30, a signal indicating that none of the call target mobile telephones positioned outdoors has answered the incoming call. Accordingly, the mobile telephone 30 displays, on its display, that none of the call target mobile telephones positioned outdoors has answered the incoming call. Note that instead of displaying such on the display, the mobile telephone 30 may notify the same to its user by other methods, such as voice navigation.

(5) Call Processing Unit 105

Upon receiving (i) the information indicating that the incoming call is placed by dialing one of the individual telephone numbers and (ii) the incoming signal, the call processing unit 105 performs, via the wireless interface 106, processing for calling the mobile telephone to which the telephone number of the called party, which is contained in the received incoming signal, is assigned. If this mobile telephone answers the incoming call, the call processing unit 105 performs connection processing that initiates communication between this mobile telephone and the calling party.

On the other hand, upon receiving (i) the information indicating that the incoming call is placed by dialing the representative telephone number, (ii) the call target telephone number and (iii) the incoming signal, the call processing unit 105 performs, via the wireless interface 106, processing for calling the mobile telephone to which the received call target telephone number is assigned. Here, the call processing unit 105 monitors whether this mobile telephone answers within a predetermined time period.

If this mobile telephone answers within the predetermined time period, the call processing unit 105 performs connection processing that initiates communication between this mobile telephone and the calling party.

If this mobile telephone does not answer within the predetermined time period, the call processing unit 105 stops the processing for calling this mobile telephone, and outputs the call timeout information to the call target confirmation unit 104.

The following describes an example of the call processing.

Upon receiving (i) the information indicating that the incoming call is placed by dialing one of the individual telephone numbers and (ii) the incoming signal, the call processing unit 105 sends, via the wireless interface 106 to the one of the individual telephone numbers, the received incoming signal as a signal of the call processing.

On the other hand, upon receiving (i) the information indicating that the incoming call is placed by dialing the representative telephone number, (ii) the call target telephone number and (iii) the incoming signal, the call processing unit 105 changes the telephone number of the called party, which is contained in the received incoming signal, to the call target telephone number. Then the call processing unit 105 sends, via the wireless interface 106 to the mobile telephone of the called party, the changed incoming signal as a signal of the call processing.

(6) Transfer Processing Unit 109

Upon receiving (i) the information indicating that the incoming call is placed by dialing the representative telephone number, (ii) the call target telephone number and (iii) the incoming signal, the transfer processing unit 109 performs, via the line interface 101, the transfer processing on the mobile telephone to which the received call target telephone number is assigned; in other words, the transfer processing unit 109 performs processing for calling this mobile telephone. Here, the transfer processing unit 109 monitors whether this mobile telephone answers within a predetermined time period.

If this mobile telephone answers within the predetermined time period, the transfer processing unit 109 performs connection processing that initiates communication between this mobile telephone and the calling party.

If this mobile telephone does not answer within the predetermined time period, the transfer processing unit 109 stops the transfer processing that has been performed on this mobile telephone, and outputs the transfer timeout information to the call target confirmation unit 104.

It should be noted that once the transfer processing unit 109 performs the transfer processing on this mobile telephone, the following takes place: (i) the mobile telephone line network 43 determines a public base station device based on the station ID stored in the position registration server 40 in correspondence with the transfer destination mobile telephone (call target mobile telephone) registered on the position registration server 40; (ii) the mobile telephone line network 43 sends the signal of the transfer processing to the determined public base station device; and (iii) the public base station device, which has received the signal of the transfer processing, sends the signal of the transfer processing to the call target mobile telephone.

The following describes an example of the transfer processing.

Upon receiving (i) the information indicating that the incoming call is placed by dialing the representative telephone number, (ii) the call target telephone number and (iii) the incoming signal, the transfer processing unit 109 changes the telephone number of the called party, which is contained in the received incoming signal, to the call target telephone number. Then the transfer processing unit 109 sends, via the line interface 101 to the mobile telephone of the called party, the changed incoming signal as a signal of the call processing.

(7) Wireless Interface 106

The wireless interface 106 is an interface for communicating with the mobile telephones positioned indoors over the wireless LAN.

Upon receiving the signal of the call processing from the call processing unit 105, the wireless interface 106 wirelessly sends the received signal to the call target mobile telephone via the antenna 107.

Upon wirelessly receiving an audio signal from the call target mobile telephone via the antenna 107, the wireless interface 106 outputs the received audio signal to the communication processing unit 108. Upon receiving an audio signal from the communication processing unit 108, the wireless interface 106 wirelessly sends the received audio signal to the send target mobile telephone via the antenna 107.

Upon receiving the position registration request from the mobile telephones positioned indoors, the wireless interface 106 outputs the received position registration request to the registration unit 110.

(8) Communication Processing Unit 108

Upon receiving an audio signal from the wireless interface 106, the communication processing unit 108 outputs the received audio signal to the line interface 101.

Upon receiving an audio signal from the line interface 101, the communication processing unit 108 outputs the received audio signal to the wireless interface 106.

(9) Registration Unit 110

Upon receiving the position registration request from the wireless interface 106, the registration unit 110 sets the presence flag, which corresponds to the telephone number indicated by the received position registration request and which is stored in the number management table T100, to "1". The registration unit 110 sends the received position registration request to the position registration server 40 via the line interface 101.

The registration unit 110 manages the statuses of all of the telephone numbers stored in the number management table T100—the statuses of whether or not these telephone numbers have been indicated by the position registration requests that the registration unit 110 have received. If there exist telephone numbers that do not get indicated by the position registration requests for a predetermined time period, the registration unit 110 sets the presence flags, which are managed in the number management table T100 and correspond to these telephone numbers, to "0".

1.3 Operations

Figure 8:
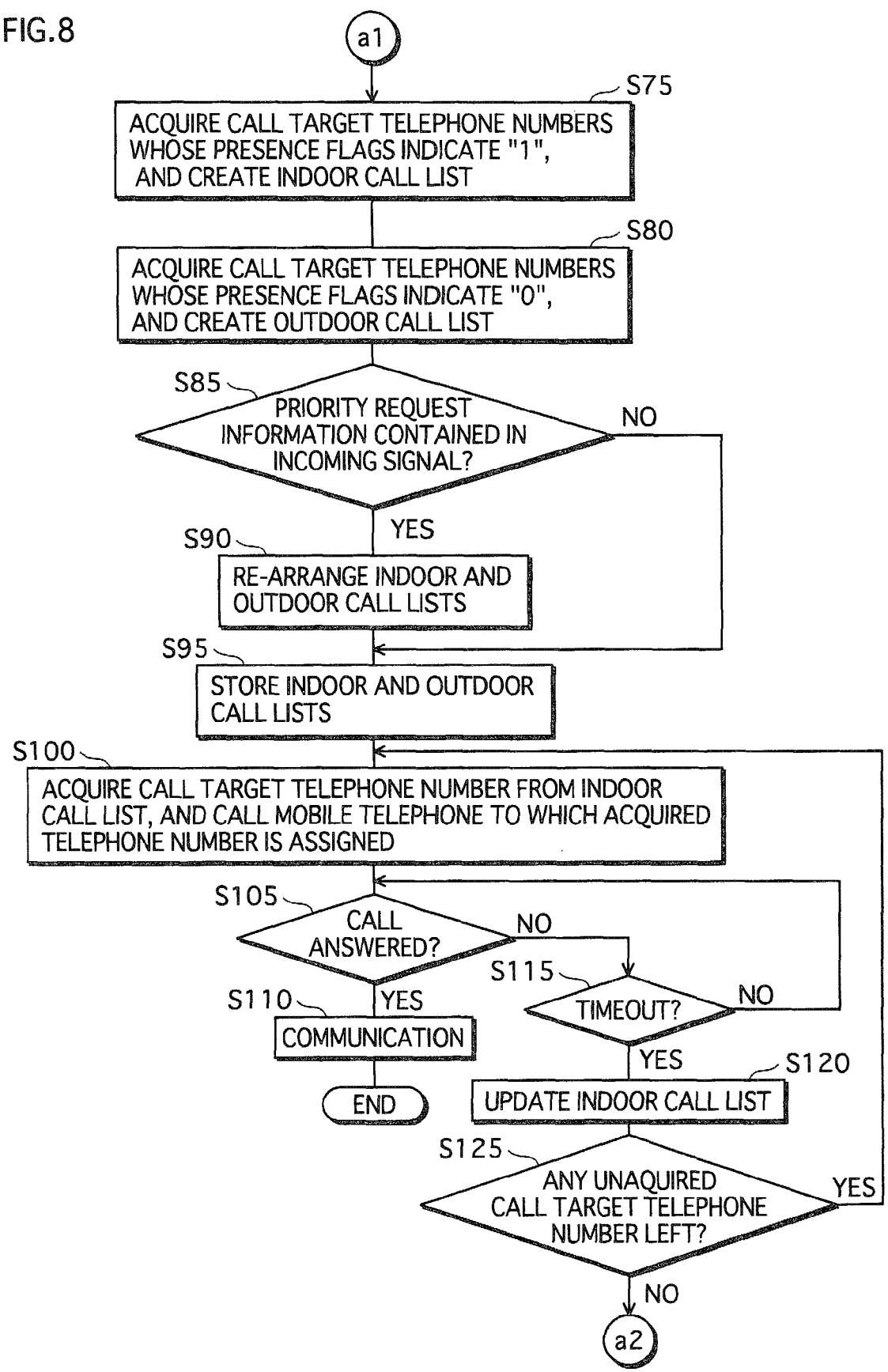
FIG. 8 is a flowchart showing operations performed when the communication connection device 10 has received the incoming signal, continued from FIG. 7 and continuing to FIG. 9.
Figure 9:
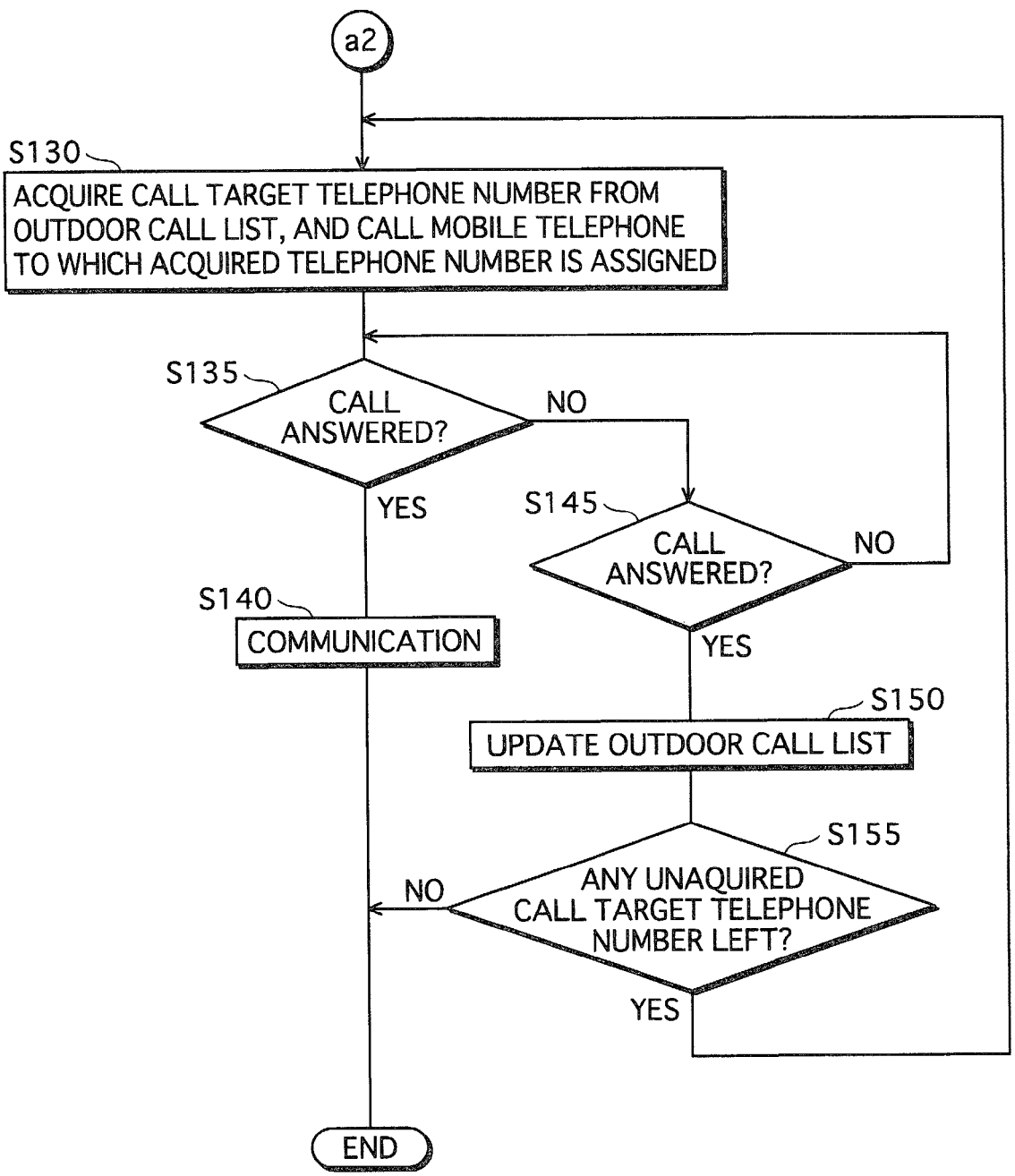
FIG. 9 is a flowchart showing operations performed when the communication connection device 10 has received the incoming signal, continued from FIG. 8.

Referring to the flowcharts of FIGS. 7, 8 and 9, the following describes operations of the communication connection device 10.

Once the mobile telephone 30 has placed a call, the line interface 101 receives an incoming signal via the public base station device 41 and the mobile telephone line network 43 (Step S5). The line interface 101 outputs the received incoming signal to the call target confirmation unit 104. The call target confirmation unit 104 receives the incoming signal from the line interface 101.

The call target confirmation unit 104 judges whether or not the received incoming signal is an incoming signal for the representative telephone number (Step S10). Specifically, the call target confirmation unit 104 judges whether or not the telephone number dialed, which is contained in the received incoming signal, matches the representative telephone number 151.

If judging the telephone number dialed does not match the representative telephone number 151—i.e., if judging the incoming call is not placed by dialing the representative telephone number (the "NO" branch of Step S1), the communication connection device 10 performs processing for connecting to an individual telephone number (Step S15).

If judging the telephone number dialed matches the representative telephone number 151—i.e., if judging the incoming call is placed by dialing the representative telephone number (the "YES" branch of Step S10), the call target confirmation unit 104 judges whether or not the incoming signal contains the first call target information as information indicating the call target (Step S20).

If judging, the first call target information is contained in the incoming signal (the "YES" branch of Step S20), the call target confirmation unit 104 acquires, from the number management table T100, all the telephone numbers whose presence flags indicate "1". Using all of the acquired telephone numbers, the call target confirmation unit 104 generates the indoor call list that includes the call target telephone numbers (Step S25).

The call target confirmation unit 104 judges whether or not the priority request information is contained in the incoming signal (Step S30). If judging the priority request information is contained in the incoming signal (the "YES" branch of Step S30), the call target confirmation unit 104 acquires the priority table T110, and based on the acquired priority table T110, re-arranges the generated indoor call list in order of priority (Step S35). The call target confirmation unit 104 stores the re-arranged indoor call list into the list storage area (Step S40). If judging the priority request information is not contained in the incoming signal (the "NO" branch of Step S30), the call target confirmation unit 104 goes on to Step S40 and stores the generated indoor call list into the list storage area.

The call target confirmation unit 104 acquires the call target telephone number that is at the top of the indoor call list stored in the list storage area, and then outputs the following to the call processing unit 105: (i) the acquired call target telephone number; (ii) the incoming signal received from the line interface 101; and (iii) the information indicating that the incoming call is placed by dialing the representative telephone number. Upon receiving (i) the information indicating that the incoming call is placed by dialing the representative telephone number, (ii) the call target telephone number and (iii) the incoming signal, the call processing unit 105 performs, via the wireless interface 106, the processing for calling the mobile telephone to which the received call target telephone number is assigned (Step S45). Here, the call processing unit 105 monitors whether this mobile telephone answers within a predetermined time period.

The call processing unit 105 monitors whether this mobile telephone answers the incoming call (Step S50). If the mobile telephone answers (the "YES" branch of Step S50), the call processing unit 105 performs the connection processing that initiates communication between this mobile telephone and the calling party (Step S55).

If this mobile telephone does not answer (the "NO" branch of Step S50), the call processing unit 105 judges whether or not the predetermined time period has passed since it started the monitoring (Step S60). If judging the predetermined time period has not passed (the "NO" branch of Step S60), the call processing unit 105 returns to Step S50.

If judging the predetermined time period has passed (the "YES" branch of Step S60), the call processing unit 105 stops the processing for calling this mobile telephone, and outputs the call timeout information to the call target confirmation unit 104. Upon receiving the call timeout information from the call processing unit 105, the call target confirmation unit 104 updates the indoor call list by discarding the call target telephone number that is at the top of the indoor call list, with the result that the indoor call list now includes the remaining call target telephone numbers (Step S65).

The call target confirmation unit 104 judges if there is any call target telephone number that has not yet been acquired and is thus left in the indoor call list (Step S70).

If judging there is a call target telephone number that has not yet been acquired and is thus left in the indoor call list (the "YES" branch of Step S70), the call target confirmation unit 104 returns to Step S45, and acquires the call target telephone number that is at the top of the updated indoor call list. Then the call processing unit 105 performs the processing for calling the mobile telephone to which the acquired call target telephone number is assigned. If judging there is no call target telephone number that has not yet been acquired from the indoor call list—i.e., if there is no more call target telephone number left in the indoor call list (the "NO" branch of Step S70), the call target confirmation unit 104 terminates the processing after sending, via the line interface 101 to the mobile telephone 30, the signal indicating that none of the call target mobile telephones positioned indoors has answered the incoming call.

If judging the first call target information is not contained in the incoming signal—i.e., if judging the second call target information is contained in the incoming signal (the "NO"

branch of Step S20), the call target confirmation unit 104 acquires, from the number management table T100, all the telephone numbers whose presence flags indicate "1", and by using all of the acquired telephone numbers, generates the indoor call list that includes the call target telephone numbers (Step S75).

The call target confirmation unit 104 acquires, from the number management table T100, all the telephone numbers whose presence flags indicate "0", and by using all of the acquired telephone numbers, generates the outdoor call list that includes the call target telephone numbers (Step S80).

The call target confirmation unit 104 judges whether or not the priority request information is contained in the incoming signal (Step S85). If judging the priority request information is contained (the "YES" branch of Step S85), the call target confirmation unit 104 acquires the priority table T110, and based on the acquired priority table T110, re-arranges the generated indoor call list and outdoor call list in order of priority (Step S90). The call target confirmation unit 104 then stores the re-arranged indoor call list and outdoor call list into the list storage area (Step S95).

If judging the priority request information is not contained in the incoming signal (the "NO" branch of Step S85), the call target confirmation unit 104 goes on to Step S95, and stores the generated indoor call list and outdoor call list into the list storage area.

The call target confirmation unit 104 acquires the call target telephone number that is at the top of the indoor call list stored in the list storage area, and then outputs the following to the call processing unit 105: (i) the acquired call target telephone number; (ii) the incoming signal received from the line interface 101; and (iii) the information indicating that the incoming call is placed by dialing the representative telephone number. Upon receiving (i) the information indicating that the incoming call is placed by dialing the representative telephone number, (ii) the call target telephone number and (iii) the incoming signal, the call processing unit 105 performs, via the wireless interface 106, the processing for calling the mobile telephone to which the received call target telephone number is assigned (Step S100). Here, the call processing unit 105 monitors whether this mobile telephone answers within a predetermined time period.

The call processing unit 105 monitors whether this mobile telephone answers the incoming call (Step S105). If this mobile telephone answers (the "YES" branch of Step S105), the call processing unit 105 performs the connection processing that initiates communication between this mobile telephone and the calling party (Step S110).

If this mobile telephone does not answer (the "NO" branch of Step S105), the call processing unit 105 judges whether or not the predetermined time period has passed since it started the monitoring (Step S115). If judging the predetermined time period has not passed (the "NO" branch of Step S115), the call processing unit 105 returns to Step S105.

If judging the predetermined time period has passed (the "YES" branch of Step S115), the call processing unit 105 stops the processing for calling this mobile telephone, and outputs the call timeout information to the call target confirmation unit 104. Upon receiving the call timeout information from the call processing unit 105, the call target confirmation unit 104 updates the indoor call list by discarding the call target telephone number that is at the top of the indoor call list, with the result that the indoor call list now includes the remaining call target telephone numbers (Step S120).

The call target confirmation unit 104 judges whether or not there is any call target telephone number that has not yet been acquired and is thus left in the indoor call list (Step S125).

If judging there is a call target telephone number that has not yet been acquired and is thus left in the indoor call list (the "YES" branch of Step S125), the call target confirmation unit 104 returns to Step S100, and acquires the call target telephone number that is at the top of the updated indoor call list. Then the call processing unit 105 performs the processing for calling the mobile telephone to which the acquired call target telephone number is assigned. If judging there is no call target telephone number that has not been acquired yet from the indoor call list—i.e., if there is no more call target telephone number left in the indoor call list (the "NO" branch of Step S125), the call target confirmation unit 104 sends, via the line interface 101 to the mobile telephone 30, the signal indicating that none of the call target mobile telephones positioned indoors has answered the incoming call.

The call target confirmation unit 104 acquires the call target telephone number that is at the top of the outdoor call list stored in the list storage area, and outputs the following to the transfer processing unit 109: (i) the acquired call target telephone number; (ii) the incoming signal received from the line interface 101; and (iii) the information indicating that the incoming call is placed by dialing the representative telephone number (Step S130).

Upon receiving (i) the information indicating that the incoming call is placed by dialing the representative telephone number, (ii) the call target telephone number and (iii) the incoming signal, the transfer processing unit 109 performs, via the line interface 101, the transfer processing on the mobile telephone to which the received call target telephone number is assigned; that is, the transfer processing unit 109 performs the processing for calling this mobile telephone. Here, the transfer processing unit 109 monitors whether this mobile telephone answers within the predetermined time period.

The transfer processing unit 109 monitors whether this mobile telephone answers the incoming call (Step S135). If this mobile telephone answers (the "YES" branch of Step S135), the transfer processing unit 109 performs the connection processing that initiates communication between this mobile telephone and the calling party (Step S140).

If this mobile telephone does not answer (the "NO" branch of Step S135), the transfer processing unit 109 judges whether or not the predetermined time period has passed since it started the monitoring (Step S145). If judging the predetermined time period has not passed (the "NO" branch of Step S145), the transfer processing unit 109 returns to Step S135.

If judging the predetermined time period has passed (the "YES" branch of Step S145), the transfer processing unit 109 stops the transfer processing that has been performed on this mobile telephone, and outputs the transfer timeout information to the call target confirmation unit 104. Upon receiving the transfer timeout information from the transfer processing unit 109, the call target confirmation unit 104 updates the outdoor call list by discarding the call target telephone number that is at the top of the outdoor call list, with the result that the outdoor call list now includes the remaining call target telephone numbers (Step S150).

The call target confirmation unit 104 judges if there is any call target telephone number that has not yet been acquired and is thus left in the outdoor call list (Step S155).

If judging there is a call target telephone number that has not yet been acquired and is thus left in the outdoor call list (the "YES" branch of Step S155), the call target confirmation unit 104 returns to Step S130, and acquires the call target telephone number that is at the top of the updated outdoor call list. Then the call processing unit 105 performs the processing for calling the mobile telephone to which the acquired call target telephone number is assigned. If judging there is no call target telephone number that has not yet been acquired from the outdoor call list—i.e., if there is no more call target telephone number left in the outdoor call list (the "NO" branch of Step S155), the call target confirmation unit 104 terminates the processing after sending, via the line interface 101 to the mobile telephone 30, the signal indicating that none of the call target mobile telephones positioned outdoors has answered the incoming call.

1.4 Exemplary Modifications

The foregoing has described the present invention based on the first embodiment, which, however, is not a limitation of the present invention. The following cases are included in the present invention.

(1) According to the foregoing description, the representative telephone number is a telephone number which is different from any of the telephone numbers assigned to the plurality of mobile telephones that belong to one group. The present invention, however, is not limited to such.

The representative telephone number may be one of the telephone numbers assigned to the plurality of mobile telephones that belong to one group.

In this case, (i) an incoming call that is meant to target the representative telephone number can be differentiated from (ii) an incoming call that is meant to target the individual telephone number by, for example, the incoming signal containing information indicating that the incoming signal is for the representative telephone number. Here, when the communication connection device judges that the telephone number dialed, which is contained in the incoming signal, is the representative telephone number, it further judges whether or not the incoming signal contains the information indicating that the incoming signal is for the representative telephone number. If judging the incoming signal contains this information, the communication connection device performs an operation of placing a call by using the representative telephone number. If judging the incoming signal does not contain this information, the communication connection device performs an operation of placing a call in the manner of dialing the individual telephone number.

Or, the communication connection device may have the following structure. Upon receiving an incoming signal that contains an individual telephone number of a called party, the communication connection device calls this individual telephone number. If there is no answer, the communication connection device regards this individual telephone number as a representative telephone number, and performs an operation of placing a call by using the representative telephone number. Here, the telephone number of the called party, which is contained in the incoming signal, may be or may not be one of the call targets.

(2) According to the foregoing description, the communication connection device judges whether the mobile telephone 30, which is the calling party, has requested to (i) only call one or more mobile telephones that are positioned indoors, or (ii) call not only the one or more mobile telephones that are positioned indoors but also one or more mobile telephones that are positioned outdoors. However, the present invention is not limited to such a structure.

The communication connection device may only call the one or more mobile telephones that are positioned indoors, or may call all the telephone numbers that are always stored in the individual number storage area 160. In this case, the incoming signal does not contain information indicating the call target. That is, the incoming signal contains neither the first call target information nor the second call target information.

Or, the communication connection device may only call the one or more mobile telephones that are positioned outdoors. In this case, the incoming signal does not contain the information indicating the call target, either.

(3) According to the foregoing description, the representative telephone number is assigned to one group. The present invention, however, is not limited to such a structure.

In a case where the mobile telephone 30 dials the representative telephone number and issues an instruction to place a call, the mobile telephone 30 may add, to one of the telephone numbers assigned to the mobile telephones that belong to the group, a representative telephone number call request for requesting that the call be placed by using the representative telephone number. The mobile telephone 30 sets the representative telephone number call request in conjunction with the telephone number of the called party, which is contained in the incoming signal. Here, the communication connection device judges whether or not the representative telephone number call request is added to the telephone number of the called party. If judging the representative telephone number call request is added to the telephone number of the called party, the communication connection device regards the telephone number of the called party as the representative telephone number, and performs the processing for placing the call by using the representative telephone number. If judging the representative telephone number call request is not added, the communication connection device connects the mobile telephone 30 and the called party in the manner of dialing the individual telephone number.

Or, the communication connection device may submit an inquiry to the calling party about whether or not the call should be placed by using the representative telephone number. In such a case, once the communication connection device receives the incoming signal, the line interface 101 temporarily holds the incoming call from the calling party and submits, as a reply message, an inquiry to the calling party about whether the call should be placed by using the representative telephone number. Depending on an instruction that received from the calling party in return, the communication connection device judges whether it should perform the operation of placing the call by using the representative number or the individual telephone number.

(4) According to the foregoing description, the communication connection device judges whether or not it should re-arrange the call list in order of priority based on the priority request information contained in the incoming signal. The present invention, however, is not limited to such a structure.

The communication connection device may submit an inquiry to the calling party about whether or not the call list should be re-arranged in order of priority. In this case, if the communication connection device judges that it is going to place a call by using the representative telephone number, it sends a reply message to the calling party, asking whether or not the call list should be re-arranged in order of priority. Depending on an instruction from the calling party, the communication connection device judges whether or not it should re-arrange the call list in order of priority.

Or, the communication connection device may judge whether or not it should re-arrange the call list in order of priority depending on the status of the call list stored in the priority storage unit 103. For example, in a case where the priority table T110 is stored in the priority storage unit 103, the communication connection device judges that it should re-arrange the call list in order of priority, whereas in a case where the priority table T110 is not stored in the priority storage unit 103, the communication connection device judges that it should not re-arrange the call list in order of priority.

(5) It is permissible to add top priority information to one of the individual telephone numbers, the top priority information indicating that the one of the individual telephone numbers is a top priority call target. In this case, upon detecting an individual telephone number and the top priority information from the incoming signal, the communication connection device regards the detected individual telephone number as the representative telephone number, and stores this telephone number to the top of the indoor call list. From then on, if the priority request information is contained in the incoming signal, the communication connection device crates the indoor call list and the outdoor call list based on the priority table T110. It is regarded, here that the mobile telephone to which the detected telephone number is assigned is positioned indoors.

(6) According to the foregoing description, the number management table includes a plurality of pairs each comprising an individual telephone number and a presence flag. However, the number management table is not limited to such, but may only include a plurality of individual telephone numbers.

In this case, the communication connection device submits an inquiry to the position registration server about whether or not the mobile telephones, which belong to the group represented by the representative telephone number, are positioned inside the house where the communication connection device is placed. Mobile telephones whose station IDs match a station ID of the communication connection device are judged to be positioned indoors (the station IDs of the mobile telephones are managed in correspondence with telephone numbers thereof). On the other hand, mobile telephones whose station IDs do no match the station ID of the communication connection device are judged to be positioned outdoors.

(7) According to the foregoing description, the number management table T100 and the priority table T110 are individual tables and thus are two different things. This, however, is not a limitation of the present invention. The communication connection device may instead manage a management table, which is the number management table T100 and the priority table T110 combined into one.

In such is the case, the management table then has an area for storing therein a plurality of sets each comprising (i) an individual telephone number, (ii) a presence flag and (iii) a priority order.

(8) According to the first embodiment, the wireless LAN of the communication connection device 10 covers the inside of the house. This, however, is not a limitation of the present invention.

The wireless LAN coverage area of the communication connection device 10 may have any boundaries, as long as the communication can be performed wirelessly within the coverage area. For example, the coverage area of the communication connection device 10 may be a partial area within the house, or may include the outside of the house as well.

Further, according to the first embodiment, the communication connection device 10 is placed inside the house. However, this is not a limitation of the present invention. The communication connection device 10 may be placed anywhere.

(9) According to the foregoing description, the representative telephone number is a telephone number that is different from any of the telephone numbers of the mobile telephones—that is, the representative telephone number is composed of decimal digits. This, however, is not a limitation of the present invention. The representative telephone number may be composed of alphabetic letters or symbols. The representative telephone number may be composed of a combination of at least two of numbers, alphabetic letters, and symbols. In other words, the representative telephone number may be anything as long as it serves as an identifier that represents a plurality of mobile telephones.

Similarly, each of the telephone numbers assigned to the mobile telephones may be composed of alphabetic letters or symbols. Or, each telephone number may be a combination of at least two of numbers, alphabetic letters, and symbols. In other worlds, the telephone numbers may be anything as long as they serve as identifiers that each identify a different one of the mobile telephones.

(10) According to the foregoing description, the telephone number storage unit is provided inside the communication connection device. However, the present invention is not limited to such a structure. The telephone number storage unit may be an outside storage device connected to the communication connection device. The connection may be established via a cable or a network.

In such a case, the representative telephone number is pre-stored into the telephone number storage unit, which is the outside storage device, by the communication connection device writing the representative telephone number thereto. Similarly, the individual telephone numbers are pre-stored into the number management table stored in the telephone number storage unit, which is the outside storage device, by the communication connection device writing the individual telephone numbers thereto. Or, the representative telephone number and the individual telephone numbers may be written to the outside storage device by another device.

(11) According to the first embodiment, the representative telephone number represents a plurality of individual telephone numbers. This, however, is not a limitation of the present invention.

The representative telephone number may represent at least one individual telephone number.

(12) The present invention may be a combination of the first embodiment and any of the above exemplary modifications.

1.5 Summary

As described in the first embodiment and the exemplary modifications, the present invention is a communication connection device that, when receiving a signal from a call originator, establishes communication between the call originator and a mobile telephone, comprising: a read unit operable to read first information pieces from a storage device when receiving the signal that contains second information, each first information piece being identification information that identifies a different one of a plurality of mobile telephones, the second information being identification information that collectively identifies the mobile telephones as a group, and the storage device having pre-stored therein, in correspondence, the first information pieces and the second information; and a call unit operable to, in a predetermined order, call the mobile telephones that are identified by the first information pieces read by the read unit.

According to the above structure, when receiving the signal that contains the second information, the communication connection device (i) reads the first information pieces corresponding to the second information contained in the received signal and (ii) calls the mobile telephones identified by the read first information pieces in the predetermined order. This way, each one of users of the mobile telephones, which are identified by the first information pieces read by the communication connection device, assumes that the incoming call is for him/herself, rather than that the incoming call is for someone else in the group. That is, the above structure ensures that someone in the group answers the incoming call for sure.

The call unit may (i) call one of the mobile telephones identified by the read first information pieces, (ii) monitor whether or not the one of the mobile telephones answers the call, (iii) stop the call to the one of the mobile telephones when a predetermined time period has passed since a start of the monitoring, and (iv) if there is another read first information piece that comes next in the predetermined order, call another one of the mobile telephones that is identified by the another read first information piece, whereas if there is no other read first information piece that comes next in the predetermined order, stop the call associated with the received signal.

According to this structure, the communication connection device monitors whether or not the one of the mobile telephones answers the call. When the predetermined time period has passed since the start of the monitoring, the communication connection device stops the call to this mobile telephone, and starts calling the another one of the mobile telephones that is identified by the another read first information piece. This way, the communication connection device can always call one mobile telephone at a time.

The communication connection device may either (i) include the storage device or (ii) be connected to and perform communication with an outside apparatus including the storage device, wherein the storage device has pre-stored therein, in one-to-one correspondence, (i) all of the first information pieces each of which identifies the different one of the mobile telephones that are collectively identified by the second information and (ii) the second information.

With this structure, the communication connection device can store the first information pieces in the storage device that is placed either inside or outside the communication connection device.

The communication connection device may be connected to a wireless LAN and perform communication with a mobile telephone via the wireless LAN, wherein (i) presence flags have been added to, in one-to-one correspondence, the all of the first information pieces corresponding to the second information, each of the presence flags indicating whether or not the corresponding one of the mobile telephones identified by the all of the first information pieces is within a coverage area of the wireless LAN, (ii) based on the presence flags that are in one-to-one correspondence with the all of the first information pieces, the read unit reads the first information pieces identifying the mobile telephones that are within the coverage area, and (iii) the call unit calls the mobile telephones via the wireless LAN.

According to this structure, the communication connection device calls the mobile telephones that are within the coverage area of the wireless LAN. This way, a person on the calling end can sequentially call, among all the mobile telephone users, those whose mobile telephones are within the coverage area.

The communication connection device may be further connected to a telephone line network, perform communication with a mobile telephone via the telephone line network, and further comprise an out-of-coverage information read unit operable to (i) based on the presence flags that are in one-to-one correspondence with the all of the first information pieces, read one or more of the all of the first information pieces that identify one or more of the mobile telephones that are outside the coverage area, and (ii) by using the read one or more of the all of the first information pieces that identify the one or more of the mobile telephones that are outside the coverage area, determine a call order for calling the one or more of the mobile telephones that are outside the coverage area, wherein if none of the mobile telephones that are within the coverage area answers the call, then the call unit further calls, via the telephone line network, the one or more of the mobile telephones that are outside the coverage area in the call order determined by the out-of-coverage information read unit.

According to this structure, if none of the mobile telephones that are within the coverage area answers the call, the communication connection device calls the one or more of the mobile telephones that are outside the coverage area. This way, if none of the users of the mobile telephones that are within the coverage area answers, the person on the calling end can expand his/her call targets to the users of the mobile telephones that are outside the coverage area.

In the communication connection device, (i) order information pieces may have been added to, in one-to-one correspondence, the all of the first information pieces corresponding to the second information, the order information pieces indicating an order of priority for calling the mobile telephones identified by the all of the first information pieces, and the call unit may call the mobile telephones identified by the read first information pieces in the order of priority indicated by the order information pieces that are in one-to-one correspondence with the read first information pieces.

According to this structure, the communication connection device calls the mobile telephones identified by the read first information pieces in the order of priority. This way, the person on the calling end can call the users of the mobile telephones in accordance with the priority order, starting with the user of the mobile telephone that is given the highest priority.

The communication connection device may be connected to a wireless LAN and a telephone line network and perform communication with a mobile telephone, wherein (i) presence flags have been added to, in one-to-one correspondence, the all of the first information pieces corresponding to the second information, each of the presence flags indicating whether or not the corresponding one of the mobile telephones identified by the all of the first information pieces is within a coverage area of the wireless LAN, (ii) based on the presence flags that are in one-to-one-correspondence with the all of the first information pieces, the read unit reads the first information pieces identifying the mobile telephones that are outside the coverage area, and (iii) the call unit calls, via the telephone line network, the mobile telephones in the predetermined order.

According to the above structure, the communication connection device calls the mobile telephones that are outside the coverage area of the wireless LAN. This way, the person on the calling end can sequentially call, among all the mobile telephone users, those whose mobile telephones are outside the coverage area.

2. Second Embodiment

The following describes a communication connection device 1010 as incorporated in a second embodiment of the present invention.

2.1 Overview

In the second embodiment, the communication connection device 1010 calls mobile telephones in order of closet to farthest from a designated position.

In the following description of the second embodiment appear the mobile telephones 20, 21, 22 and 31, the position registration server 40, the public base station device 41 and 42, and the mobile telephone line network 43, which have been described in the first embodiment.

The communication connection device 1010 is placed indoors, and has pre-stored therein (i) telephone numbers that are respectively assigned to the mobile telephones 20, 21, 22, 23 and 24, and (ii) a representative telephone number that represents a group of the mobile telephones 20, 21, 22, 23 and 24. Here, as in the case of the first embodiment, the representative telephone number is a telephone number that is different from any of the telephone numbers assigned to the mobile telephones 20, 21, 22, 23 and 24, but that is in fact assigned to the communication connection device 1010. Furthermore, the representative telephone number assigned to the communication connection device 1010 is different from any other representative telephone numbers that are assigned to other communication connection devices (not illustrated).

As in the case of the first embodiment, the mobile telephones 20, 21, 22, 23 and 24 can each communicate over a wireless LAN and CDMA. Each of the mobile telephones 20, 21, 22, 23 and 24 can further acquire its position using GPS (a Global Positioning System).

The mobile telephone 30 has a function of displaying a map as operated as such by its user, and of acquiring the latitude and longitude of a position (hereinafter, "reference position") indicated by the user on the displayed map. Here, as an example, the reference position indicated by the user is 34° 38' North, 135° 38' East in terms of latitude and longitude.

When the communication connection device 1010 receives (i) the representative telephone number and (ii) from the user of the mobile telephone 30, an instruction to sequentially call the mobile telephones in order of closest to farthest from the reference position, the incoming signal contains call information that includes reference position information indicating the reference position. Here, the reference position information indicates the acquired latitude and longitude; i.e., 34° 38' North, 135° 38' East.

Also, as in the case of the first embodiment, the incoming signal further contains the priority request information requesting that one or more telephone numbers, which are to be called by dialing the representative number, be called in order of priority.

Similarly, in the second embodiment, the position registration server 40 manages current positions of the mobile telephones in accordance with position registration requests from the mobile telephones. Also, the position registration server 40 has stored therein a pair of (i) a station ID that identifies the communication connection device 1010 and (ii) the representative telephone number assigned to the communication connection device 1010.

2.2 Structure of Communication Connection Device 1010

As shown in FIG. 10, the communication connection device 1010 includes: a line interface 1101; a telephone number storage unit 1102; a priority storage unit 1103; a call target confirmation unit 1104; a call processing unit 1105; a wireless interface 1106; an antenna 1107; a communication processing unit 1108; a transfer processing unit 1109; a registration unit 1110; and a terminal position acquisition unit 1111.

Specifically, the communication connection device 1010 is a computer system composed of a microprocessor, a ROM, a RAM, a hard disk unit, a display unit, etc. A computer program is stored in the ROM or the hard disk unit. The communication connection device 1010 achieves its functions by the microprocessor operating in accordance with the computer program.

(1) Line Interface 1101

The line interface 1101 is an interface for connecting to the mobile telephone line network 43—more specifically, to an optical line. Note that the line interface 1101 is not limited to the interface for connecting to the optical line; it may be an interface for connecting to, for example, ADSL.

Once the mobile telephone 30 has initiated a call, the line interface 1101 receives a reception signal via the public base station device 41 and the mobile telephone line network 43. Examples of the reception signal include: the incoming signal sent in association with the incoming call; and an audio signal sent during a telephone conversation.

If receiving the incoming signal as the reception signal, the line interface 1101 outputs the received incoming signal to the call target confirmation unit 1104. On the other hand, if receiving the audio signal as the reception signal, the line interface 1101 outputs the received audio signal to the communication processing unit 1108.

Upon receiving the audio signal from the communication processing unit 1108, the line interface 1101 sends the received audio signal to the mobile telephone 30 via the mobile telephone line network 43 and the public base station device 41.

Upon receiving the position registration request from the registration unit 1110, the line interface 1101 sends the following over the mobile telephone line network 43 to the position registration server 40: (i) the received position registration request; and (ii) the station ID assigned to the communication connection device 1010. Here, the position registration request is composed of a mobile telephone number and information indicating that the registration request is being made.

Upon receiving a signal of transfer processing from the transfer processing unit 1109, the line interface 1101 sends the received signal to a transfer destination mobile telephone over the mobile telephone line network 43.

Upon receiving, from the terminal position acquisition unit 1111, a position information request which requests for pieces of terminal position information respectively indicating positions of the mobile telephones that are outdoors, the line interface 1101 sends the received position information request to these mobile telephones over the mobile telephone line network 43. Here, the pieces of terminal position information are expressed in terms of latitude and longitude.

Upon receiving, from the call target confirmation unit 1104, a signal to be sent to the mobile telephone 30, the line interface 1101 sends the received signal to the mobile telephone 30 via the mobile telephone line network 43 and the public base station device 41.

(2) Telephone Number Storage Unit 1102

A description of the telephone number storage unit 1102 is omitted here since it is the same as the telephone number storage unit 102 described in the first embodiment.

The description below incorporates the representative number storage area 150, the individual number storage area 160 and the number management table T100 that are shown in FIG. 3 as necessary. The representative telephone number is pre-stored into the representative number storage area 150 by the communication connection device 1010 writing the representative telephone number thereto. Similarly, the individual telephone numbers are pre-stored into the number management table T100 by the communication connection device 1010 writing the individual telephone numbers thereto.

(3) Priority Storage Unit 1103

A description of the priority storage unit 1103 is omitted here since it is the same as the priority storage unit 103 described in the first embodiment.

The description below incorporates the priority table T110 shown in FIG. 4 as necessary.

(4) Call Target Confirmation Unit 1104

The call target confirmation unit 1104 is composed of: (i) a position information storage area for storing therein the reference position information; and (ii) a list storage area for storing therein a position information management list and an indoor call list. Here, the position information management list includes (a) telephone numbers of one or more mobile telephones that are positioned outdoors and (b) the pieces of terminal position information that respectively correspond to these mobile telephones. On the other hand, the indoor call list includes the telephone numbers of the call target mobile telephones that are positioned indoors.

The call target confirmation unit 1104 receives the incoming signal from the line interface 1101.

The call target confirmation unit 1104 judges whether or not the telephone number dialed, which is contained in the received incoming signal, matches the representative telephone number 151.

If judging the telephone number dialed does not match the representative telephone number 151, the call target confirmation unit 1104 outputs, to the call processing unit 1105, (i) the received incoming signal and (ii) information indicating that the incoming call is placed by dialing an individual telephone number.

If judging that the telephone number dialed matches the representative telephone number 151, the call target confirmation unit 1104 further judges whether or not the incoming signal contains the call information—i.e., whether or not the incoming signal contains the reference position information.

If judging the incoming signal contains the reference position information, the call target confirmation unit 1104 acquires the reference position information contained in the incoming signal, and stores the acquired reference position information into the position information storage area. Here, a latitude of 34° 38' North and a longitude of 135° 38' East are stored as the reference position information.

The call target confirmation unit 1104 acquires, from the number management table T100, all the telephone numbers whose presence flags indicate "0". Here, the call target confirmation unit 104 acquires, from the number management table T100, the telephone numbers 164 and 165 that are assigned to the mobile telephones 22 and 23, respectively.

The call target confirmation unit 1104 outputs the following to the terminal position acquisition unit 1111: (i) all of the acquired telephone numbers; and (ii) a position information acquisition instruction that issues an instruction to acquire the pieces of terminal position information that respectively indicate the positions of the mobile telephones.

Upon receiving, from the terminal position acquisition unit 1111, (i) the telephone numbers and (ii) the pieces of terminal position information that respectively correspond to the mobile telephones to which these telephone numbers are assigned, the call target confirmation unit 1104 generates the position information management list in accordance with the order of the telephone numbers stored in the number management table T100. An example of the generated position information management list is shown in FIG. 11A as a position information management list T200. Here, the telephone numbers are those whose presence flags in the number management table T100 indicate "0", whereas the pieces of terminal position information respectively indicate the positions of the mobile telephones to which these telephone numbers are assigned.

The call target confirmation unit 1104 calculates respective distances between the reference position and each mobile telephone by using (i) the pieces of terminal position information stored in the generated position information management table and (ii) the reference position information stored in the position information storage area. Based on the calculated distances, the call target confirmation unit 1104 re-arranges the pairs of the telephone number and the piece of terminal position information included in the generated position management information list, so that the mobile telephones are listed in order of closest to farthest from the reference position. Re-arranging the position information management list T200 results in a position information management list T201 shown in FIG. 11B. The call target confirmation unit 1104 then stores the re-arranged position information management list into the list storage area.

The call target confirmation unit 1104 acquires the call target telephone number that is at the top of the position information management list stored in the list storage area, and then outputs the following to the transfer processing unit 1109: (i) the acquired call target telephone number; (ii) the incoming signal received from the line interface 1101; and (iii) information indicating that the incoming call is placed by dialing the representative telephone number. The call target confirmation unit 1104 sends, via the line interface 1101 to the mobile telephone 30, a signal indicating the current call target telephone number. Accordingly, the mobile telephone 30 displays, on its display, the telephone number indicated by the received signal as the telephone number that is currently being called. Note that instead of displaying the telephone number on the display, the mobile telephone 30 may notify the same to its user by other methods, such as voice navigation.

Upon receiving transfer timeout information indicating that the transfer processing unit 1109 has run out of time to perform transfer processing, the call target confirmation unit 1104 updates the position information management list by discarding the call target telephone number and the piece of terminal position information that are at the top of the position information management list, with the result that the position information management list now includes the remaining call target telephone numbers and the pieces of terminal position information. The call target confirmation unit 1104 then outputs the following to the transfer processing unit 1109: (i) the call target telephone number that is at the top of the updated position information management list; (ii) the incoming signal received from the line interface 1101; and (iii) the information indicating that the incoming call is placed by dialing the representative telephone number.

When there is no more pair of the call target telephone number and the piece of terminal position information left, the call target confirmation unit 104 sends, via the line interface 1101 to the mobile telephone 30, a signal indicating that none of the call target mobile telephones positioned outdoors has answered the incoming call. Accordingly, the mobile telephone 30 displays, on its display, that none of the call target mobile telephones positioned outdoors has answered the incoming call. Note that instead of displaying such on the display, the mobile telephone 30 may notify the same to its user by other methods, such as voice navigation.

Once the call target confirmation unit 1104 sends, to the mobile telephone 30, the signal indicating that none of the call target mobile telephones positioned outdoors has answered the incoming call, the call target confirmation unit 1104 regards the mobile telephones that are positioned indoors as call targets, and generates the indoor call list. From here on, the call target confirmation unit 1104 performs the same operations as it does when the first call target information is contained in the incoming signal, as described in the first embodiment; a description of which is hence omitted.

Similarly, if judging the incoming signal does not contain the reference position information, the call target confirmation unit 1104 performs the same operations as it does when the first call target information is contained in the incoming signal, as described in the first embodiment; a description of which is hence omitted.

(5) Terminal Position Acquisition Unit 1111

Upon receiving, from the call target confirmation unit 1104, (i) the telephone numbers of all of the mobile telephones that are positioned outdoors and (ii) the position information acquisition instruction, the terminal position acquisition unit 1111 sends, via the line interface 1101 to these mobile telephones, the position information request that requests for the pieces of terminal position information.

Upon receiving the pieces of terminal position information respectively from the mobile telephones via the line interface 1101, the terminal position acquisition unit 1111 outputs, to the call target confirmation unit 1104, each of the received pieces of position information and each of the telephone numbers corresponding thereto as a pair.

(6) Call Processing Unit 1105

A description of the call processing unit 1105 is omitted here since it performs the same operations as the call processing unit 105 described in the first embodiment.

(7) Transfer Processing Unit 1109

A description of the transfer processing unit 1109 is omitted here since it performs the same operations as the transfer processing unit 109 described in the first embodiment.

(8) Wireless Interface 1106

A description of the wireless interface 1106 is omitted here since it performs the same operations as the wireless interface 106 described in the first embodiment.

(9) Communication Processing Unit 1108

A description of the communication processing unit 1108 is omitted here since it performs the same operations as the communication processing unit 108 described in the first embodiment.

(10) Registration Unit 1110

A description of the registration unit 1110 is omitted here since it performs the same operations as the registration unit 110 described in the first embodiment.

2.3 Operations

Figure 13:
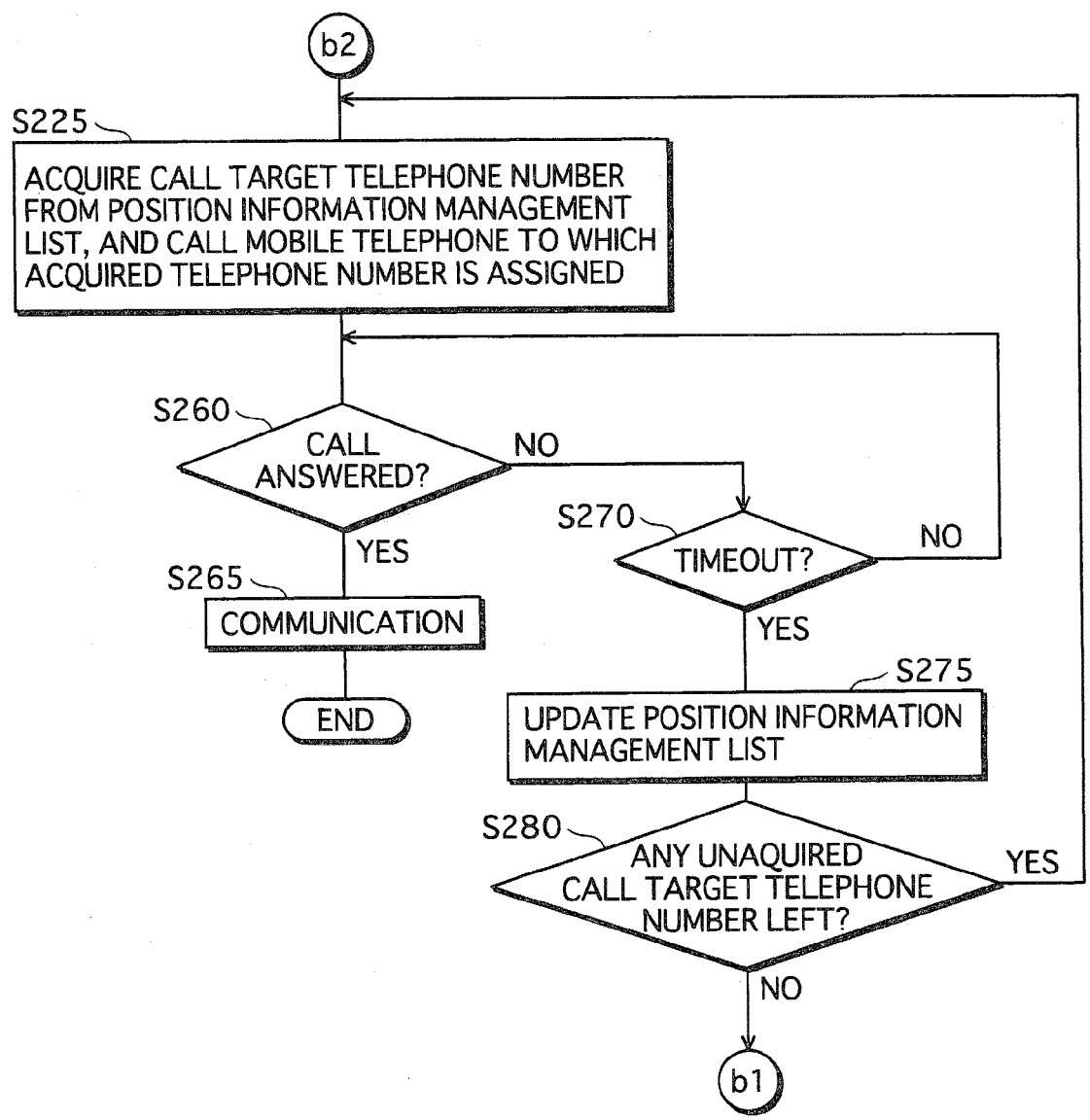
FIG. 13 is a flowchart showing operations performed when the communication connection device 1010 receives the incoming signal, continued from FIG. 12 and continuing to FIG. 14.
Figure 14:
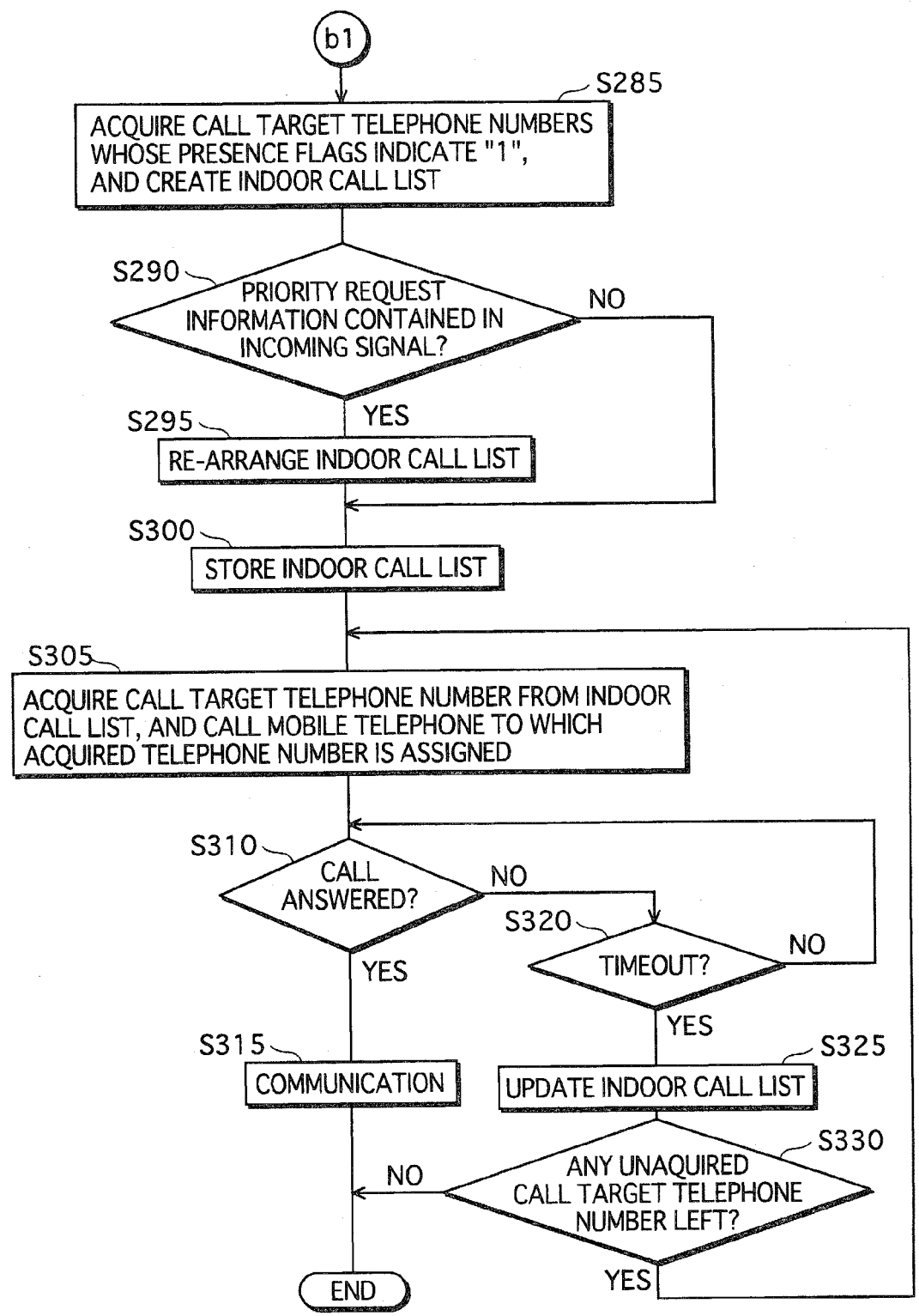
FIG. 14 is a flowchart showing operations performed when the communication connection device 1010 receives the incoming signal, continued from FIG. 13.

Referring to the flowcharts of FIGS. 12, 13 and 14, the following describes operations of the communication connection device 1010.

As the mobile telephone 30 initiates a call, the line interface 1101 receives an incoming signal over the mobile telephone line network (Step S200). The line interface 1101 outputs the received incoming signal to the call target confirmation unit 1104. The call target confirmation unit 1104 receives the incoming signal from the line interface 1101.

The call target confirmation unit 1104 judges whether or not the incoming call indicated by the received incoming signal is placed by dialing the representative telephone number (Step S205). Specifically, the call target confirmation unit 1104 judges whether or not the telephone number dialed, which is contained in the received incoming signal, matches the representative telephone number 151.

If judging the telephone number dialed does not match the representative telephone number 151—i.e., if judging the incoming call is not placed by dialing the representative telephone number (the "NO" branch of Step S205), the communication connection device 1010 performs processing for connecting to an individual telephone number (Step S210).

If judging the telephone number dialed matches the representative telephone number 151—i.e., if judging the incoming call is placed by dialing the representative telephone number (the "YES" branch of Step S205), the call target confirmation unit 1104 judges whether or not the call information is contained in the incoming signal—i.e., whether or not the reference position information is contained in the incoming signal (Step S215).

If judging the reference position information is contained in the incoming signal (the "YES" branch of Step S215), the call target confirmation unit 1104 acquires the reference position information contained in the incoming signal, and stores the acquired reference, position information into the position information storage area (Step S220).

The call target confirmation unit 1104 acquires, from the number management table T100, all the telephone numbers whose presence flags indicate "0" (Step S225).

The call target confirmation unit 1104 outputs, to the terminal position acquisition unit 1111, (i) all of the acquired telephone numbers and (ii) the position information acquisition instruction that issues the instruction to acquire the pieces of terminal position information respectively indicating the positions of these mobile telephones. Upon receiving, from the call target confirmation unit 1104, (i) the telephone numbers of all of the mobile telephones that are positioned outdoors and (ii) the position information acquisition instruction, the terminal position acquisition unit 1111 sends, via the line interface 1101 to these mobile telephones, the position information request that requests for the pieces of terminal position information. The terminal position acquisition unit 1111 acquires the pieces of terminal position information respectively from these mobile telephones via the line interface 1101 (Step S230).

The terminal position acquisition unit 1111 outputs, to the call target confirmation unit 1104, each of the received position information and each of the telephone numbers corresponding thereto as a pair. Upon receiving, from the terminal position acquisition unit 1111, (i) the telephone numbers and (ii) the pieces of terminal position information that respectively correspond to the mobile telephones to which these telephone numbers are assigned, the call target confirmation unit 1104 generates the position information management list in accordance with the order of the telephone numbers stored in the number management table T100 (Step S235).

The call target confirmation unit 1104 calculates respective distances between the reference position and each mobile telephone by using (i) the pieces of terminal position information stored in the generated position information management table and (ii) the reference position information stored in the position information storage area (Step S240). Based on the calculated distances, the call target confirmation unit 1104 re-arranges the pairs of the telephone numbers and the pieces of terminal position information included in the generated position management information list, so that the mobile telephones are listed in order of closest to farthest from the reference position (Step S245).

The call target confirmation unit 1104 then stores the re-arranged position information management list into the list storage area (Step S250).

The call target confirmation unit 1104 acquires the call target telephone number that is at the top of the position information management list stored in the list storage area, and then outputs the following to the transfer processing unit 1109: (i) the acquired call target telephone number; (ii) the incoming signal received from the line interface 1101; and (iii) the information indicating that the incoming call is placed by dialing the representative telephone number. Upon receiving (i) the information indicating that the incoming call is placed by dialing the representative telephone number, (ii) the call target telephone number and (iii) the incoming signal, the transfer processing unit 1109 performs, via the line interface 1101, the transfer processing on the mobile telephone to which the received call target telephone number is assigned; that is, the transfer processing unit 1109 performs processing for calling this mobile telephone (Step S255). Here, the transfer processing unit 1109 monitors whether this mobile telephone answers within a predetermined time period.

The transfer processing unit 1109 monitors whether this mobile telephone answers the incoming call (Step S260). If this mobile telephone answers (the "YES" branch of Step S260), the transfer processing unit 1109 performs connection processing that initiates communication between this mobile telephone and the calling party (Step S265).

If this mobile telephone does not answer (the "NO" branch of Step S260), the transfer processing unit 1109 judges whether or not the predetermined time period has passed since it started the monitoring (Step S270). If judging the predetermined time period has not passed (the "NO" branch of Step S270), the transfer processing unit 1109 returns to Step S260.

If judging the predetermined time period has passed (the "YES" branch of Step S270), the transfer processing unit 1109 stops the transfer processing that has been performed on this mobile telephone, and outputs the transfer timeout information to the call target confirmation unit 1104. Upon receiving the transfer timeout information from the transfer processing unit 1109, the call target confirmation unit 1104 updates the position information management list by discarding the call target telephone number and the piece of terminal position information that are at the top of the position information management list, with the result that the position information, management list now includes the remaining call target telephone numbers and the pieces of the terminal position information (Step S275).

The call target confirmation unit 1104 judges if there is any call target telephone number that has not yet been acquired and is thus left in the position information management list (Step S280).

If judging there is a call target telephone number that has not yet been acquired and is thus left in the position information management list (the "YES" branch of Step S280), the call target confirmation unit 1104 returns to Step S255, and acquires the call target telephone number that is at the top of the updated position information management list. Then the transfer processing unit 1109 performs the processing for calling the mobile telephone to which the acquired call target telephone number is assigned. If judging there is no call target telephone number that has not been acquired yet from the position information management list—i.e., if there is no more call target telephone number and piece of terminal position information left in the position information management list (the "NO" branch of Step S280), the call target confirmation unit 1104 sends, via the line interface 1101 to the mobile telephone 30, the signal indicating that none of the call target mobile telephones positioned outdoors has answered the incoming call.

The call target confirmation unit 1104 acquires, from the number management table T100, all the telephone numbers whose presence flags indicate "1". Using all of the acquired telephone numbers, the call target confirmation unit 1104 generates the indoor call list that includes the call target telephone numbers, in accordance with the order of the call target telephone numbers stored in the number management table T100 (Step S285).

The call target confirmation unit 1104 judges whether or not the incoming signal contains the priority request information (Step S290). If judging the incoming signal contains the priority request information (the "YES" branch of Step S290), the call target confirmation unit 1104 acquires the priority table T110, and based on the acquired priority table T110, re-arranges the generated indoor call list in order of priority (Step S295). The call target confirmation unit 1104 stores the re-arranged indoor call list into the list storage area (Step S300). If judging the priority request information is not contained in the incoming signal (the "NO" branch of Step S290), the call target confirmation unit 1104 goes on to Step S300 and stores the generated indoor call list into the list storage area.

The call target confirmation unit 1104 acquires and outputs, to the call processing unit 1105, (i) the call target telephone number that is at the top of the indoor call list stored in the list storage area, (ii) the incoming signal received from the line interface 1101 and (iii) the information indicating that the incoming call is placed by dialing the representative telephone number. Upon receiving (i) the information indicating that the incoming call is placed by dialing the representative telephone number, (ii) the call target telephone number and (iii) the incoming signal, the call processing unit 1105 performs, via the wireless interface 1106, the processing for calling the mobile telephone to which the received call target telephone number is assigned (Step S305). Here, the call processing unit 1105 monitors whether this mobile telephone answers within a predetermined time period.

The call processing unit 1105 monitors whether this mobile telephone answers the incoming call (Step S310). If the mobile telephone answers (the "YES" branch of Step S310), the call processing unit 1105 performs the connection processing that initiates communication between this mobile telephone and the calling party (Step S315).

If this mobile telephone does not answer (the "NO" branch of Step S310), the call processing unit 1105 judges whether or not the predetermined time period has passed since it started the monitoring (Step S320). If judging the predetermined time period has not passed (the "NO" branch of Step S320), the call processing unit 1105 returns to Step S310.

If judging the predetermined time period has passed (the "YES" branch of Step S320), the call processing unit 1105 stops the processing for calling this mobile telephone, and outputs the call timeout information to the call target confirmation unit 1104. Upon receiving the call timeout information from the call processing unit 1105, the call target confirmation unit 1104 updates the indoor call list by discarding the call target telephone number that is at the top of the indoor call list, with the result that the indoor call list now includes the remaining call target telephone numbers (Step S325).

The call target confirmation unit 1104 judges if there is any call target telephone number that has not yet been acquired and is thus left in the indoor call list (Step S330).

If judging there is a call target telephone number that has not yet been acquired and is thus left in the indoor call list (the "YES" branch of Step S330), the call target confirmation unit 1104 returns to Step S305, and acquires the call target telephone number that is at the top of the updated indoor call list. Then the call processing unit 1105 calls the mobile telephone to which the acquired call target telephone number is assigned. If judging there is no call target telephone number that has not yet been acquired from the indoor call list—i.e., if there is no more call target telephone number left in the indoor call list (the "NO" branch of Step S330), the call target confirmation unit 1104 terminates the processing after sending, via the line interface 1101 to the mobile telephone 30, the signal indicating that none of the call target mobile telephones positioned indoors has answered the incoming call.

If judging the incoming signal does not contain the reference position information (the "NO" branch of Step S215), the call target confirmation unit 1104 performs the operations of Step S285 and all the operations that follow Step S285.

2.4 Exemplary Modifications

The foregoing has described the present invention based on the second embodiment, which, however, is not a limitation of the present invention. The following cases are included in the present invention.

(1) The requests for the pieces of terminal position information may be made periodically. In this case, the call target confirmation unit 1104 has a timer. With a timer, the call target confirmation unit 1104 acquires all the telephone numbers whose presence flags indicate "0" periodically (e.g., once an hour) from the number management table T100, generates a position information management list that includes the acquired telephone numbers, and stores the position information management list into the list storage area. Upon receiving the incoming signal from the line interface 1101, the call target confirmation unit 1104 performs the following operations: If the telephone number dialed, which is contained in the received incoming signal, matches the representative telephone number 151, and if the incoming signal contains the reference position information, the call target confirmation unit 1104 acquires the reference position information. Then, by using (i) the acquired position information and (ii) the pieces of terminal position information stored in the position information management table, the call target confirmation unit 1104 calculates respective distances between the reference position and each mobile telephone. Based on the calculated distances, the call target confirmation unit 1104 updates the position information management list by re-arranging the pairs of the telephone numbers and the pieces of terminal position information included in the stored position management information list, so that the mobile telephones are listed in order of closest to farthest from the reference position. By using the updated position information management list, the call target confirmation unit 1104 performs the operation of placing a call by using the representative telephone number.

A description of the operations of generating the position information management list is omitted here since they are the same as those described in the second embodiment.

The number management table may have an area for storing therein one or more sets each comprising (i) a telephone number, (ii) a presence flag and (iii) a piece of terminal position information. In this case, instead of generating the position information management list periodically, the call target confirmation unit 1104 may acquire the pieces of terminal position information periodically, and write the acquired pieces of terminal position information to the number management table. Here, the call target confirmation unit 1104 does not write anything as the terminal position information that corresponds to a telephone number whose presence flag indicates "1".

(2) According to the foregoing description, the reference position information and the terminal position information are expressed in terms of latitude and longitude; which, however, is not a limitation of the present invention. The reference position information may be a station ID assigned to a public base station device of an area the reference position belongs to, whereas the terminal position information may be a station ID assigned to a public base station device of an area a mobile telephone belongs to.

In such a case, the mobile telephone 30 converts a pair of latitude and longitude, which indicates the reference position, into the station ID (hereinafter, "reference station ID").

If the telephone number dialed matches the representative telephone number 151, and if the incoming signal contains the reference position information, the communication connection device does not submit an inquiry to the mobile telephone of the calling party about the terminal position information, but instead submits an inquiry to the position registration server about a station ID corresponding to the mobile telephone of the calling party. By using the reference station ID and each station ID, the communication connection device sorts the position management information list so that the mobile telephone numbers are listed in order of closest to farthest from the area indicated by the reference station ID. Then, based on the sorted position information management list, the call target confirmation unit 1104 performs the operation of placing the call by using the representative telephone number.

(3) In the above (2), the mobile telephone 30 converts the pair of latitude and longitude, which indicates the reference position, into the reference station ID. This, however, is not a limitation of the present invention. Another device (e.g., the position registration server 40) may perform this conversion.

In such a case, the mobile telephone 30 sends the pair of latitude and longitude to, and receives the reference station ID from another device (e.g., the position registration server 40). When the mobile telephone 30 places a call by dialing the representative telephone number, the incoming signal contains call information that includes reference position information composed of the reference station ID.

Or, the communication connection device may convert the pair of latitude and longitude, which indicates the reference position, into the reference station ID. In such a case, when the mobile telephone 30 places a call by dialing the representative telephone number, the incoming signal contains call information that includes reference position information composed of latitude and longitude. If the telephone number dialed, which is contained in the incoming signal, matches the representative telephone number 151, and if the incoming signal contains the reference position information, the communication connection device acquires the reference station ID by using the latitude and longitude, which are indicated by the reference position information contained in the incoming signal. Then, the communication connection device stores the acquired reference station ID into the position information storage area as the reference position information. Instead of submitting an inquiry to the mobile telephone 30 about the terminal position information, the communication connection device submits an inquiry to the position registration server about the station ID corresponding to the mobile telephone 30. By using the reference station ID and each station ID, the communication connection device sorts the position management information list so that the telephone numbers of the mobile telephones are listed in order of closest to farthest from the area indicated by the reference station ID. Then, based on the sorted position information management list, the call target confirmation unit 1104 performs the operation of placing the call by using the representative telephone number.

(4) According to the foregoing description, the mobile telephone 30 displays a map as operated as such by its user, and acquires the reference position indicated by the user on the displayed map. This, however, is not a limitation of the present invention. The reference position information may be information indicating a position of the mobile telephone 30.

(5) Or, the reference position information may be information indicating a position where the communication connection device is placed. In this case, when the mobile telephone 30 places a call by dialing the representative telephone number, the incoming signal contains call information indicating that the call is going to be placed in accordance with the position information.

The communication connection device has pre-stored, in the position information storage area, reference position information indicating a position where it is placed. If the telephone number dialed, which is contained in the incoming signal, matches the representative telephone number 151, and if the incoming signal contains the reference position information, the communication connection device acquires, from the number management table T100, all the telephone numbers whose presence flags indicate "0", and by using all of the acquired telephone numbers, generates the position information management list. From here on, the communication connection device performs the same operations as it does in the second embodiment; a description of which is hence omitted.

Or, the reference position information may be information indicating a position where the communication connection device is placed. In this case, the communication connection device may always place the call in accordance with the position information. Here, the incoming signal does not contain the call information indicating that the call is going to be placed in accordance with the position information.

Or, with regard to the call order, the communication connection device may first sequentially call the mobile telephones that are positioned indoors, and then sequentially call the mobile telephones that are positioned outdoors. This way, the communication connection device can call the mobile telephones in order of the closest to farthest from the house where it is placed.

(6) The communication connection device may rule out, as the call target, a mobile telephone that is away from the position indicated by the reference position information by a predetermined distance or more.

In such a case, the communication connection device acquires pieces of terminal position information of all the mobile telephones that belong to the group indicated by the representative telephone number, including the mobile telephones that are positioned indoors. The communication connection device then generates the position information management list.

By using the reference position information and the acquired pieces of the terminal position information, the communication connection device calculates respective distances between the reference position and each mobile telephone, and then judges whether or not each calculate distance is the predetermined distance (e.g., 50 km) or more. If there are mobile telephones that are judged to be away from the reference position by the predetermined distance or more, the communication connection device discards, from the position information management list, (i) pieces of terminal position information used for the calculation and (ii) telephone numbers that correspond to these mobile telephones. Targeting every single piece of terminal position information in the above judging and discarding operations will result in the position information management list containing only telephone numbers and pieces of terminal position information that correspond to the mobile telephones that are positioned within the predetermined distance of the position indicated by the reference position information.

For example, if the reference position information contained in the incoming signal indicates the position where the communication connection device is placed, mobile telephones that are positioned within the predetermined distance of the house where the communication connection device is placed would be call targets.

(7) In the second embodiment, with regard to the call order, the communication connection device first sequentially calls the mobile telephones that are positioned outdoors, and then sequentially calls the mobile telephones that are positioned indoors. This, however, is not a limitation of the present invention. The communication connection device may sequentially call only the mobile telephones that are positioned indoors.

In such a case, when the mobile telephone 30 places a call by dialing the representative telephone number, the above can be implemented by having the incoming signal contain information indicating whether or not the mobile telephones positioned indoors should be call targets.

(8) In the second embodiment, the wireless LAN of the communication connection device 1010 covers the inside of the house. This, however, is not a limitation of the present invention.

The wireless LAN coverage area of the communication connection device 1010 may have any boundaries, as long as the communication can be performed wirelessly within the coverage area. For example, the coverage area of the communication connection device 1010 may be a partial area within the house, or may include the outside of the house as well.

Further, according to the foregoing description, the communication connection device 1010 is placed inside the house. This, however, is not a limitation of the present invention. The communication connection device 1010 may be placed anywhere.

(9) According to the foregoing description, the representative telephone number is a telephone number that is different from any of the telephone numbers of the mobile telephones—that is, the representative telephone number is composed of decimal digits. This, however, is not a limitation of the present invention. The representative telephone number may be composed of alphabetic letters or symbols. The representative telephone number may be composed of a combination of at least two of numbers, alphabetic letters, and symbols. In other words, the representative telephone number may be anything as long as it serves as an identifier that represents a plurality of mobile telephones.

Similarly, each of the telephone numbers assigned to the mobile telephones may be composed of alphabetic letters or symbols. Or, each telephone number may be a combination of at least two of numbers, alphabetic letters, and symbols. In other worlds, the telephone numbers may be anything as long as they serve as identifiers that each identify a different one of the mobile telephones.

(10) According to the foregoing description, the telephone number storage unit is provided inside the communication connection device. However, the present invention is not limited to such a structure. The telephone number storage unit may be an outside storage device connected to the communication connection device. The connection may be established via a cable or a network.

In such a case, the representative telephone number is pre-stored into the telephone number storage unit, which is the outside storage device, by the communication connection device writing the representative telephone number thereto. Similarly, the individual telephone numbers are pre-stored into the number management table stored in the telephone number storage unit, which is the outside storage device, by the communication connection device writing the individual telephone numbers thereto. Or, the representative telephone number and the individual telephone numbers may be written to the outside storage device by another device.

(11) In the second embodiment, the representative telephone number represents a plurality of individual telephone numbers. This, however, is not a limitation of the present invention.

The representative telephone number may represent at least one individual telephone number.

(12) The present invention may be a combination of the second embodiment and any of the exemplary modifications.

2.5 Summary

As described in the second embodiment and the exemplary modifications, the present invention is a communication connection device that, when receiving a signal from a call originator, establishes communication between the call originator and a mobile telephone, comprising: a read unit operable to read first information pieces from a storage device when receiving the signal that contains second information, each first information piece being identification information that identifies a different one of a plurality of mobile telephones, the second information being identification information that collectively identifies the mobile telephones as a group, and the storage device having pre-stored therein, in correspondence, the first information pieces and the second information; and a call unit operable to, in a predetermined order, call the mobile telephones that are identified by the first information pieces read by the read unit.

According to the above structure, when receiving the signal that contains the second information, the communication connection device (i) reads the first information pieces corresponding to the second information contained in the received signal and (ii) calls the mobile telephones identified by the read first information pieces in the predetermined order. This way, each one of users of the mobile telephones, which are identified by the first information pieces read by the communication connection device, assumes that the incoming call is for him/herself, rather than that the incoming call is for someone else in the group. That is, the above structure ensures that someone in the group answers the incoming call for sure.

The call unit may (i) call one of the mobile telephones identified by the read first information pieces, (ii) monitor whether or not the one of the mobile telephones answers the call, (iii) stop the call to the one of the mobile telephones when a predetermined time period has passed since a start of the monitoring, and (iv) if there is another read first information piece that comes next in the predetermined order, call another one of the mobile telephones that is identified by the another read first information piece, whereas if there is no other read first information piece that comes next in the predetermined order, stop the call associated with the received signal.

According to this structure, the communication connection device monitors whether or not the one of the mobile telephones answers the call. When the predetermined time period has passed since the start of the monitoring, the communication connection device stops the call to this mobile telephone, and starts calling the another one of the mobile telephones that is identified by the another read first information piece. This way, the communication connection device can always call one mobile telephone at a time.

The communication connection device may either (i) include the storage device or (ii) be connected to and perform communication with an outside apparatus including the storage device, wherein the storage device has pre-stored therein, in one-to-one correspondence, (i) all of the first information pieces each of which identifies the different one of the mobile telephones that are collectively identified by the second information and (ii) the second information.

With this structure, the communication connection device can store the first information pieces in the storage device that is placed either inside or outside the communication connection device.

The communication connection device may further comprise an acquisition unit operable to acquire terminal position information pieces that each indicate a different one of present positions of the mobile telephones, wherein the received signal further contains reference position information that indicates a predetermined position, and the read unit (i) acquires the reference position information from the received signal, (ii) controls the acquisition unit to acquire the terminal position information pieces of the mobile telephones identified by the read first information pieces, (iii) by using the reference position information and the terminal position information pieces acquired by the acquisition unit, calculates respective distances between the predetermined position and each of the present positions of the mobile telephones identified by the read first information pieces, and (iv) determines a call order such that the call is placed to the mobile telephones identified by the read first information pieces in order of shortest to longest distance.

With this structure, the communication connection device determines the call order for calling the mobile telephones in order of closest to farthest from the predetermined position. This way, the person on the calling end can sequentially call the users of the mobile telephones in order of closest to farthest from the predetermined position.

The communication connection device may further comprise an acquisition unit operable to acquire terminal position information pieces that each indicate a different one of present positions of the mobile telephones identified by the all of the first information pieces, wherein the read unit (i) controls the acquisition unit to acquire the terminal position information pieces of the mobile telephones identified by the read first information pieces, (ii) by using the terminal position information pieces acquired by the acquisition unit, calculates respective distances between a place where the communication connection device is placed and each of the present positions of the mobile telephones identified by the read first information pieces, and (iii) determines a call order such that the call is placed to the mobile telephones identified by the read first information pieces in order of shortest to longest distance.

With this structure, the communication connection device determines the call order for calling the mobile telephones in order of closest to farthest from the position where the communication connection device is placed. This way, the person on the calling end can sequentially call the users of the mobile telephones in order of closest to farthest from the position where the communication connection device is placed.

The communication connection device may further comprise an acquisition unit operable to acquire terminal position information pieces that each indicate a different one of present positions of the mobile telephones, wherein the received signal further contains reference position information that indicates a predetermined position, and the read unit (i) acquires the reference position information from the received signal, (ii) controls the acquisition unit to acquire the terminal position information pieces of the mobile telephones that are identified by the all of the first information pieces corresponding to the second information, (iii) by using the reference position information and the terminal position information pieces acquired by the acquisition unit, calculates respective distances between the predetermined position and each present position, and (iv) based on the calculated distances, reads the first information pieces identifying the mobile telephones that are within a predetermined distance of the predetermined position.

With this structure, the communication connection device calls the mobile telephones that are within the predetermined distance of the position indicated by the reference position information. Accordingly, the person on the calling end can sequentially call, among all the mobile telephone users, those whose mobile telephones are within the predetermined distance of the coverage area.

3. Summary

The present invention can easily meet the need of the calling party to get connected to one of his/her family members without specifying a certain individual—e.g., when it does not matter who the called party is.

3.1 Exemplary Modifications

The foregoing has described the present invention based on the first and second embodiments and the exemplary modifications thereof. However, it goes without saying that the present invention is not limited to such. The following cases are included in the present invention.

(1) According to the foregoing description, the mobile telephones 20, 21, 22, 23 and 24 each communicate via the public base station device and CDMA. This, however, is not limitation of the present invention.

For example, the mobile telephones 20, 21, 22, 23 and 24 may communicate with public base station devices via GSM (Global System for Mobile) or PDC (Personal Digital Cellular).

(2) In the first embodiment, the communication connection device is assigned one representative telephone number. The present invention, however, is not limited to such a structure. The communication connection device may be assigned a plurality of representative telephone numbers.

In such a case, the present invention, for example, has the following structure. Note that the following only describes features that are different from the first embodiment. Specifically, the following describes the structure of the representative number storage area and the individual number storage area.

The representative number storage area has pre-stored therein a plurality of representative telephone numbers, each of which is assigned to a different one of communication connection devices and is different from the rest of the representative telephone numbers that are assigned to other communication connection devices.

The individual number storage area contains a number management table that has an area for storing therein a plurality of sets each comprising (i) a key number, (ii) an individual telephone number and (iii) a presence flag. Each representative telephone number is one of the representative telephone numbers stored in the representative number storage area. Each individual telephone number belongs to at least one of groups indicated by the key numbers. The presence flags show whether or not the mobile telephones that are assigned the individual telephone numbers are positioned within the coverage area of the communication connection device.

Here, in a case where one individual telephone number belongs to more than one of the groups indicated by the representative telephone numbers, each of these representative telephone numbers (i.e., key numbers) is stored in correspondence with this individual telephone number and the corresponding presence flag in the number management table. For example, in a case where one individual telephone number "telephone number A" belongs to two groups indicated by two representative telephone numbers "telephone number B" and "telephone number C", the number management table stores therein the following two sets: (i) a set comprising the representative telephone number "telephone number B", the individual telephone number "telephone number A" and the corresponding presence flag; and (ii) a set comprising the representative telephone number "telephone number C", the individual telephone number "telephone number A" and the corresponding presence flag.

The above structure is merely an example of the present invention, and thus is not a limitation thereof. The present invention may have any structure as long as the communication connection device stores therein, in correspondence, (i) a representative telephone number and (ii) individual telephone numbers that belong to a group indicated by the representative telephone number.

Similarly, in the second embodiment, the communication connection device may be assigned a plurality of representative telephone numbers. In such a case, the present invention can be realized by the above structure; a description of which is thus omitted here.

(3) In the first and second embodiments, the mobile telephone 30 does not belong to the group of the mobile telephones 20, 21, 22, 23 and 24. This, however, is not a limitation of the present invention.

The mobile telephone 30 may belong to the group of the mobile telephones 20, 21, 22, 23 and 24. In such a case, once the communication connection device receives, from the mobile telephone 30, the incoming signal containing the representative telephone number as the telephone number dialed, the communication connection device rules out the mobile telephone 30 as a call target, and then acquires, among the telephone numbers assigned to the remaining mobile telephones, call target telephone numbers.

(4) The present invention may be the above-described methods, a computer program that achieves these methods, or a digital signal containing the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording medium.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(5) The present invention may be any combination of the above-described embodiments and modifications.

Industrial Applicability

The present invention can be used business-wise (i.e., recurrently and continuously) in an industry manufacturing and selling a communication connection device for, by using a representative telephone number, calling telephone numbers of mobile telephones that belong to a group indicated by the representative telephone number.

The invention claimed is:

1. A communication connection device that, when receiving a signal from a call originator, establishes communication between the call originator and a mobile telephone in accordance with first information pieces and second information, each first information piece including identification information that identifies a different one of a plurality of mobile telephones, the second information including identification information that collectively identifies the plurality of mobile telephones as a group, the communication connection device comprising:
    a detection unit operable to, when the signal is received from the call originator, detect whether or not the received signal includes the second information;
    a read unit operable to, when the detection unit has detected that the received signal includes the second information, read the first information pieces from a storage device that has pre-stored therein, in correspondence, the first information pieces and the second information;
    a call unit operable to, in a predetermined order, call the mobile telephones that are identified by the first information pieces read by the read unit; and
    a transmission unit operable to, while the call unit is calling the mobile telephones that are identified by the read first information pieces in the predetermined order, transmit information indicating one of the mobile telephones that is currently being called to the call originator.

2. The communication connection device of claim 1, wherein
    the call unit (i) calls one of the mobile telephones identified by the read first information pieces, (ii) monitors whether or not the one of the mobile telephones answers the call, (iii) stops the call to the one of the mobile telephones when a predetermined time period has passed since a start of the monitoring, and (iv) if there is another read first information piece that comes next in the predetermined order, calls another one of the mobile telephones that is identified by the another read first information piece, whereas if there is no other read first information piece that comes next in the predetermined order, stops the call associated with the received signal.

3. The communication connection device of claim 2 that either (i) includes the storage device or (ii) is connected to and performs communication with an outside apparatus including the storage device, wherein
    the storage device has pre-stored therein, in one-to-one correspondence, (i) all of the first information pieces each of which identifies the different one of the mobile telephones that are collectively identified by the second information and (ii) the second information.

4. The communication connection device of claim 3 that is connected to a wireless LAN and performs communication with a mobile telephone via the wireless LAN, wherein
    presence flags have been added to, in one-to-one correspondence, the all of the first information pieces corresponding to the second information, each of the presence flags indicating whether or not the corresponding one of the mobile telephones identified by the all of the first information pieces is within a coverage area of the wireless LAN,
    based on the presence flags that are in one-to-one correspondence with the all of the first information pieces, the read unit reads the first information pieces identifying the mobile telephones that are within the coverage area, and
    the call unit calls the mobile telephones via the wireless LAN.

5. The communication connection device of claim 4 that is further connected to a telephone line network and performs communication with a mobile telephone via the telephone line network, further comprising:
    an out-of-coverage information read unit operable to (i) based on the presence flags that are in one-to-one correspondence with the all of the first information pieces, read one or more of the all of the first information pieces that identify one or more of the mobile telephones that are outside the coverage area, and (ii) by using the read one or more of the all of the first information pieces that identify the one or more of the mobile telephones that are outside the coverage area, determine a call order for calling the one or more of the mobile telephones that are outside the coverage area, wherein
    if none of the mobile telephones that are within the coverage area answers the call, then the call unit further calls, via the telephone line network, the one or more of the mobile telephones that are outside the coverage area in the call order determined by the out-of-coverage information read unit.

6. The communication connection device of claim 3, wherein
    order information pieces have been added to, in one-to-one correspondence, the all of the first information pieces corresponding to the second information, the order information pieces indicating an order of priority for calling the mobile telephones identified by the all of the first information pieces, and
    the call unit calls the mobile telephones identified by the read first information pieces in the order of priority indicated by the order information pieces that are in one-to-one correspondence with the read first information pieces.

7. The communication connection device of claim 3, further comprising:
    an acquisition unit operable to acquire terminal position information pieces that each indicate a different one of present positions of the mobile telephones, wherein
    the received signal further contains reference position information that indicates a predetermined position, and
    the read unit (i) acquires the reference position information from the received signal, (ii) controls the acquisition unit to acquire the terminal position information pieces of the mobile telephones identified by the read first information pieces, (iii) by using the reference position information and the terminal position information pieces acquired by the acquisition unit, calculates respective distances between the predetermined position and each of the present positions of the mobile telephones identified by the read first information pieces, and (iv) determines a call order such that the call is placed to the mobile telephones identified by the read first information pieces in order of shortest to longest distance.

8. The communication connection device of claim 3, further comprising:
    an acquisition unit operable to acquire terminal position information pieces that each indicate a different one of present positions of the mobile telephones identified by the all of the first information pieces, wherein
    the read unit (i) controls the acquisition unit to acquire the terminal position information pieces of the mobile telephones identified by the read first information pieces, (ii) by using the terminal position information pieces acquired by the acquisition unit, calculates respective distances between a place where the communication connection device is placed and each of the present positions of the mobile telephones identified by the read first information pieces, and (iii) determines a call order such that the call is placed to the mobile telephones identified by the read first information pieces in order of shortest to longest distance.

9. The communication connection device of claim 3, further comprising:
an acquisition unit operable to acquire terminal position information pieces that each indicate a different one of present positions of the mobile telephones, wherein
the received signal further contains reference position information that indicates a predetermined position, and
the read unit (i) acquires the reference position information from the received signal, (ii) controls the acquisition unit to acquire the terminal position information pieces of the mobile telephones that are identified by the all of the first information pieces corresponding to the second information, (iii) by using the reference position information and the terminal position information pieces acquired by the acquisition unit, calculates respective distances between the predetermined position and each present position, and (iv) based on the calculated distances, reads the first information pieces identifying the mobile telephones that are within a predetermined distance of the predetermined position.

10. The communication connection device of claim 3 that is connected to a wireless LAN and a telephone line network and performs communication with a mobile telephone, wherein
presence flags have been added to, in one-to-one correspondence, the all of the first information pieces corresponding to the second information, each of the presence flags indicating whether or not the corresponding one of the mobile telephones identified by the all of the first information pieces is within a coverage area of the wireless LAN,
based on the presence flags that are in one-to-one-correspondence with the all of the first information pieces, the read unit reads the first information pieces identifying the mobile telephones that are outside the coverage area, and
the call unit calls, via the telephone line network, the mobile telephones in the predetermined order.

11. A calling method used in a communication connection device that, when receiving a signal from a call originator, establishes communication between the call originator and a mobile telephone in accordance with first information pieces and second information, each first information piece including identification information that identifies a different one of a plurality of mobile telephones, the second information including identification information that collectively identifies the mobile telephones as a group, the calling method comprising the steps of:

detecting, when the signal is received from the call originator, whether or not the received signal includes the second information;
reading the first information pieces from a storage device when the detecting step has detected that the received signal includes the second information, the storage device having pre-stored therein, in correspondence, the first information pieces and the second information;
calling, in a predetermined order, the mobile telephones identified by the read first information pieces; and
transmitting, to the call originator, information indicating one of the mobile telephones that is currently being called while the calling step is calling the mobile telephones identified by the read first information pieces in the predetermined order.

12. The communication connection device of claim 1, wherein
when the detection unit has detected that the received signal includes the second information, the detection unit further detects whether or not the received signal also includes certain information indicating an order in which the mobile telephones identified by the first information pieces should be called, and
when the detection unit has detected that the received signal includes the certain information, the call unit calls the mobile telephones identified by the first information pieces in the order indicated by the detected certain information.

13. A non-transitory computer-readable medium storing instructions thereon for, when executed by a process, performing a calling method used in a communication connection device, the calling method comprising:
detecting, when a signal is received from a call originator, whether or not the received signal includes a second information including identification information that collectively identifies a plurality of mobile telephones as a group;
reading first information pieces, each first information piece including identification information that identifies a different one of the plurality of mobile telephones, when the detecting step has detected that the received signal includes the second information;
calling, in a predetermined order, the mobile telephones identified by the read first information pieces; and
transmitting, to a call originator, information indicating one of the mobile telephones that is currently being called while the calling step is calling the mobile telephones identified by the read first information pieces in the predetermined order.

* * * * *